(12) United States Patent
Tanaka et al.

(10) Patent No.: US 10,874,976 B2
(45) Date of Patent: Dec. 29, 2020

(54) ACID GAS REMOVAL APPARATUS AND ACID GAS REMOVAL METHOD

(71) Applicant: Mitsubishi Heavy Industries Engineering, Ltd., Kanagawa (JP)

(72) Inventors: Hiroshi Tanaka, Tokyo (JP); Takuya Hirata, Tokyo (JP); Takashi Kamijo, Tokyo (JP); Tatsuya Tsujiuchi, Tokyo (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 0 days.

(21) Appl. No.: 16/635,476

(22) PCT Filed: Oct. 15, 2018

(86) PCT No.: PCT/JP2018/038317
§ 371 (c)(1),
(2) Date: Jan. 30, 2020

(87) PCT Pub. No.: WO2019/078156
PCT Pub. Date: Apr. 25, 2019

(65) Prior Publication Data
US 2020/0368674 A1    Nov. 26, 2020

(30) Foreign Application Priority Data

Oct. 20, 2017    (JP) .................. 2017-203727

(51) Int. Cl.
*B01D 53/14*    (2006.01)
*B01D 53/18*    (2006.01)
(Continued)

(52) U.S. Cl.
CPC ..... *B01D 53/1425* (2013.01); *B01D 53/1412* (2013.01); *B01D 53/1462* (2013.01);
(Continued)

(58) Field of Classification Search
None
See application file for complete search history.

(56) References Cited

U.S. PATENT DOCUMENTS

2016/0256825 A1* 9/2016 Tanaka .................. B01D 53/62

FOREIGN PATENT DOCUMENTS

JP    2012-236170 A    12/2012
JP    2013-099727 A    5/2013

* cited by examiner

*Primary Examiner* — Daniel Berns
(74) *Attorney, Agent, or Firm* — Osha Bergman Watanabe & Burton LLP

(57) ABSTRACT

An acid gas removal apparatus includes a reclaimer control device that performs: first supply water control in which at least one of reflux water, steam condensate, and desalinated water is supplied to a reclaimer as first supply water, at non-volatile component removal reclaiming; second supply water control in which at least one of the reflux water, the steam condensate, and the desalinated water is supplied to the reclaimer, and a washing liquid including an acid gas absorbing liquid is supplied to the reclaimer as second supply water, at an initial stage of finish reclaiming; and third supply water control in which supply of the second supply water is stopped and at least one of the reflux water, the steam condensate, and the desalinated water is supplied as the first supply water, at a later stage of the finish reclaiming.

10 Claims, 15 Drawing Sheets

(51) Int. Cl.
  *B01D 53/56*   (2006.01)
  *B01D 53/78*   (2006.01)
  *B01D 53/80*   (2006.01)
  *B01D 53/96*   (2006.01)
  *B01D 53/52*   (2006.01)
(52) U.S. Cl.
  CPC ........... *B01D 53/18* (2013.01); *B01D 53/526* (2013.01); *B01D 53/56* (2013.01); *B01D 53/78* (2013.01); *B01D 53/80* (2013.01); *B01D 2251/404* (2013.01); *B01D 2251/608* (2013.01); *B01D 2252/20478* (2013.01)

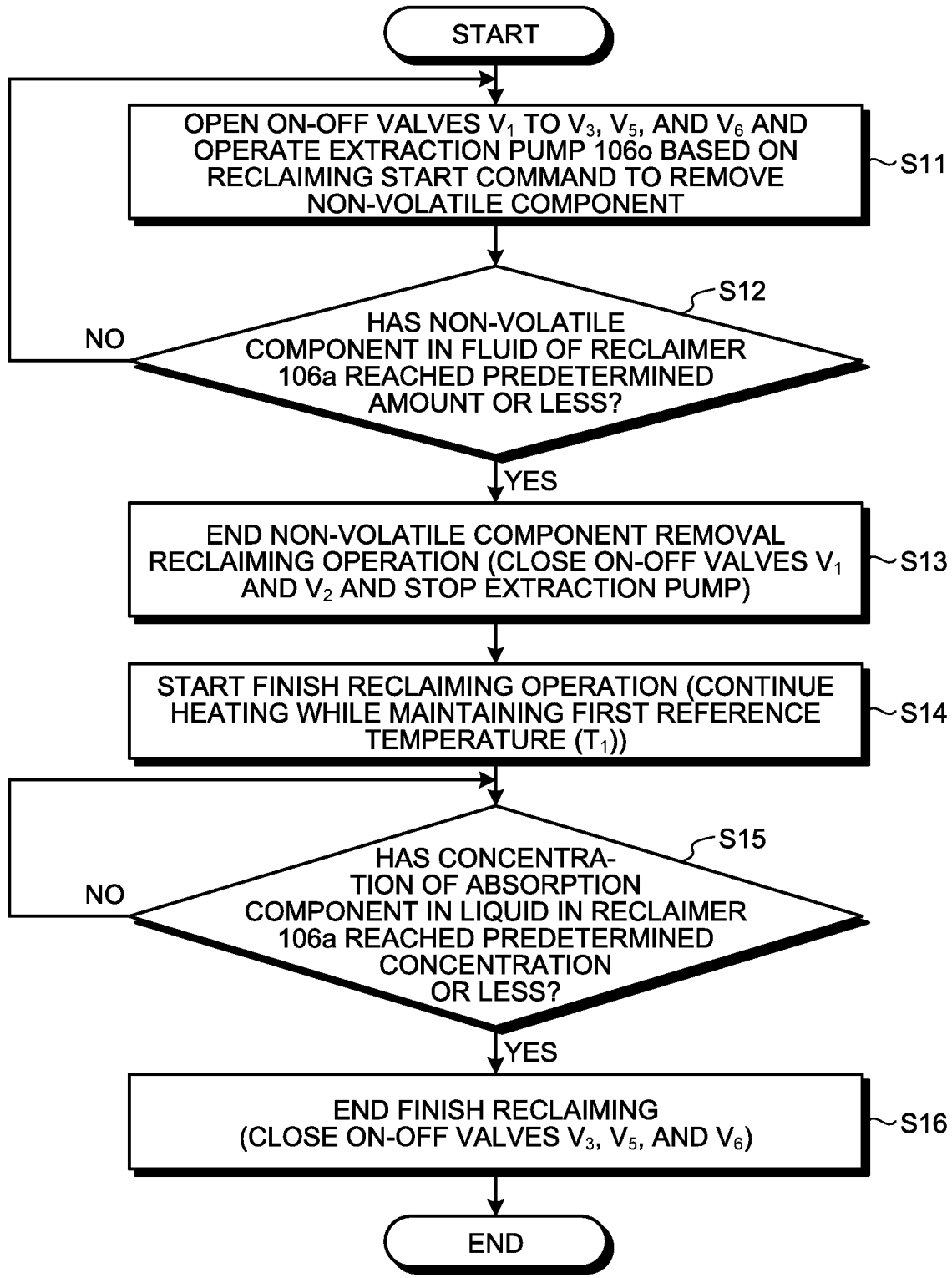

ACID GAS REMOVAL APPARATUS AND ACID GAS REMOVAL METHOD

CROSS-REFERENCE TO RELATED APPLICATION

This application is a National Stage of PCT international application Ser. No. PCT/JP2018/038317 filed on Oct. 15, 2018 which designates the United States, incorporated herein by reference, and which is based upon and claims the benefit of priority from Japanese Patent Application No. 2017-203727 filed on Oct. 20, 2017, the entire contents of which are incorporated herein by reference.

FIELD

The present invention relates to an acid gas removal apparatus including a reclaiming device removing degradation products accumulated in an absorbing liquid that absorbs acid gas in a gas, and an acid gas removal method.

BACKGROUND

In thermal power plants and the like using a large amount of fossil fuel, flue gas generated by burning fossil fuel in a boiler, coal gasified gas (gasified gas) obtained by gasifying coal, and natural gas include acid gas components (such as $CO_2$ and $H_2S$). Gas including such acid components is subjected to gas-liquid contact with, for example, an amine-based acid gas absorbing liquid in an absorption tower such that acid gas is absorbed into the acid gas absorbing liquid. In this manner, the acid gas in the gas is removed and recovered.

For example, a method is used in which, after the acid gas absorbing liquid absorbs and removes the acid gas in the gas, such as the flue gas and the gasified gas, in the absorption tower, the acid gas absorbed into the acid gas absorbing liquid is released in a regeneration tower, the regenerated acid gas absorbing liquid is then supplied to the absorption tower again to be reused, and the acid gas absorbing liquid is circulated and used in a closed circulation system between the absorption tower and the regeneration tower.

At a step of recovering acid gas components (such as $CO_2$ and $SO_2$) from the flue gas discharged from the boiler, and a step of removing acid gas components (such as $CO_2$ and $H_2S$) in natural gas and/or coal gasified gas discharged from the gasification furnace, the amine-based acid gas absorbing liquid to be used generates degradation products including non-volatile substances called "heat stable amine salt" (HSAS) due to a product caused for degradation in a gas to be treated and decomposition of the acid gas absorbing liquid itself.

Because the degradation products generated due to the acid gas absorbing liquid are highly corrosive, a method is used in which the acid gas absorbing liquid is supplied to a reclaiming device including a reclaimer to remove the degradation products in the acid gas absorbing liquid. In the method, after the removal, the absorbent of the acid gas absorbing liquid is returned into the circulation system together with the recovered vapor, for example.

In the reclaiming operation, when the concentration of the degradation products in the acid gas absorbing liquid circulating in the circulation system exceeds a specific value, a part of the acid gas absorbing liquid circulating in the circulation system is extracted and supplied to the reclaimer, an alkaline agent is added to the reclaimer to separate and remove the degradation products from the acid gas absorption component, and the acid gas absorption component is returned into the circulation system. As described above, in conventional technology, the concentration of the degradation products in the acid gas absorbing liquid circulating in the circulation system is measured, and the operation of the reclaimer is performed repeatedly in accordance with the concentration (for example, see Patent Literatures 1 and 2).

CITATION LIST

Patent Literature

Patent Literature 1: Japanese Patent Application Laid-open publication No. 2012-236170
Patent Literature 2: Japanese Patent Application Laid-open publication No. 2013-99727

SUMMARY

Technical Problem

In a reclaiming operation in conventional technology, by heating the absorbing liquid including the extracted degradation products in the reclaimer, the degradation products are concentrated as a reclaiming residue and recovered, and the absorption component is returned to the circulation system as recovered vapor. This prevents degradation products from accumulating in the circulation system through which the acid gas absorbing liquid passes. However, in the reclaiming operation using heating and vaporization operations, a part of the absorbing liquid component may remain in the reclaiming residue without being vaporized. This causes a loss of the absorption component, and thus the absorption component, which is comparatively expensive, needs to be added in order to cover the loss.

For this reason, in conventional technology, when non-volatile substances accumulated in the absorbing liquid, such as an contaminants from the flue gas and degradation products of the absorbing liquid, are separated from the absorbing liquid by the reclaiming operation and discharged and removed to the outside of the system, a finish reclaiming operation is performed. In the finish reclaiming operation, after the supply of the absorbing liquid including non-volatile substances to the reclaiming device is stopped, water and steam are supplied to return the absorption component remaining in the reclaiming residue in the reclaiming device into the circulation system together with the recovered vapor.

However, in the finish reclaiming operation in conventional technology, the pressure in the reclaiming device is fixed. For this reason, when the finish reclaiming operation is continued, the concentration of the absorption component in the reclaiming residue decreases. This causes the decrease in absorption component vapor pressure and requirement of a longer time for the finish reclaiming operation.

In view of the problem described above, a problem to be solved by the present invention is to provide an acid gas removal apparatus and an acid gas removal method capable of reducing the recovery time of the finish reclaiming operation of recovering the absorption component remaining in the reclaiming residue, after the reclaiming operation of removing the non-volatile substance is finished.

Solution to Problem

An acid gas removal apparatus according to a first aspect of the present invention for solving the problem described above, includes: an acid gas absorption tower that removes acid gas in a gas by bringing the acid gas into contact with an acid gas absorbing liquid; an absorbing liquid regeneration tower that regenerates, using vapor of a reboiler, a rich solution having the acid gas absorbed therein as a lean solution; a reclaimer that extracts the lean solution, and introduces and stores therein the extracted lean extraction solution; an alkaline agent supply pipe that supplies an alkaline agent to an inside of the reclaimer; a water supply pipe that supplies supply water to the inside of the reclaimer; a recovered vapor discharge pipe that introduces recovered vapor discharged from the reclaimer into the acid gas absorption tower or the regeneration tower; and a reclaimer control device that controls operation of the reclaimer. The reclaimer control device performs: first supply water control in which at least one of reflux water from the regeneration tower, steam condensate, and desalinated water is supplied to the reclaimer as first supply water to be supplied to the water supply pipe, at non-volatile component removal reclaiming of introducing the lean extraction solution to the reclaimer and separating a non-volatile component in the lean extraction solution; second supply water control in which at least one of the reflux water, the steam condensate, and the desalinated water is supplied to the reclaimer as the first supply water, and a washing liquid including the acid gas absorbing liquid in a water wash section of the acid gas absorption tower is supplied to the reclaimer as second supply water, at an initial stage of finish reclaiming to recover an absorption component in reclaiming residue after introduction of the lean extraction solution into the reclaimer is stopped; and third supply water control in which supply of the second supply water is stopped and at least one of the reflux water, the steam condensate, and the desalinated water is supplied as the first supply water, at a later stage of the finish reclaiming.

A second aspect is the acid gas removal apparatus according to the first aspect, in which switching of implementation of the second supply water control and the third supply water control is performed when a remaining concentration of an acid gas absorption component in the reclaiming residue becomes equal to a concentration of an acid gas absorption component in the washing liquid, or close to the concentration of the acid gas absorption component in the washing liquid.

A third aspect is the acid gas removal apparatus according to the first or second aspect, further including: a thermometer that measures temperature in the reclaimer; and a pressure gauge that measures pressure in the reclaimer, in which the reclaimer control device performs the first supply water control to the third supply water control, and in which, at the finish reclaiming of recovering the absorption component in the reclaiming residue after introducing the lean extraction solution into the reclaimer is stopped, the reclaimer control device performs pressure control of regulating the pressure in the reclaimer such that a reference temperature is maintained, the reference temperature being a temperature in the reclaimer at the time when the introduction of the lean extraction solution into the reclaimer is stopped.

A forth aspect is the acid gas removal apparatus according to the third aspect, in which, when the pressure in the reclaimer reaches an upper limit pressure value of an operation upper limit of the reclaimer, the reclaimer control device changes a target reference temperature to a temperature lower than the reference temperature and regulates the pressure in the reclaimer such that the changed reference temperature is maintained.

A fifth aspect is the acid gas removal apparatus according to the fourth aspect, in which the target reference temperature is changed within a temperature range from the reference temperature in the reclaimer at the time when the introduction of the lean extraction solution into the reclaimer is stopped to a temperature lowered by a predetermined temperature from the reference temperature.

A sixth aspect is the acid gas removal apparatus according to any one of the first to fifth aspects, in which, when the reclaimer is a pressurizing type reclaimer, regulation of the pressure with the reclaimer control device is performed by regulating a throttle valve installed in the recovered vapor discharge pipe.

A seventh aspect is the acid gas removal apparatus according to any one of the first to fifth aspects, in which, when the reclaimer is a vacuum type reclaimer, regulation of the pressure with the reclaimer control device is performed by regulating a decompressor installed in the recovered vapor discharge pipe.

An acid gas removal method according to an eighth aspect of the present invention, including an acid gas removal step of removing acid gas using an acid gas absorption tower that removes acid gas in a gas by bringing the acid gas into contact with an acid gas absorbing liquid, and an absorbing liquid regeneration tower that regenerates a rich solution having the acid gas absorbed therein as a lean solution using vapor of a reboiler; a non-volatile component removal reclaiming step of extracting part of the lean solution regenerated by the regeneration tower, continuously introducing and storing the extracted lean extraction solution into the reclaimer, introducing an alkaline agent and supply water into the reclaimer to heat the lean extraction solution therewith, and recovering a remaining absorption component from the lean extraction solution as recovered vapor while separating a non-volatile component in the lean extraction solution; a step of stopping the introduction of the lean extraction solution into the reclaimer; and a finish reclaiming step of further recovering the absorption component from a residue in the reclaimer, in which, in the non-volatile component removal reclaiming, first supply water control is performed in which at least one of reflux water from the regeneration tower, steam condensate, and desalinated water is supplied to the reclaimer as first supply water to be supplied to a water supply pipe; and in which, at an initial stage of the finish reclaiming, second supply water control is performed in which at least one of the reflux water, the steam condensate, and the desalinated water is supplied to the reclaimer as the first supply water, and a washing liquid including the acid gas absorbing liquid in a water wash section of the acid gas absorption tower is supplied to the reclaimer as second supply water; and in which, at a later stage of the finish reclaiming, third supply water control is performed in which the supply of the second supply water is stopped and at least one of the reflux water, the steam condensate, and the desalinated water is supplied as the first supply water.

A ninth aspect is the acid gas removal method according to the eighth aspect, in which switching of implementation of the second supply water control and the third supply water control is performed when a remaining concentration of an acid gas absorption component in the reclaiming residue becomes equal to a concentration of an acid gas absorption component in the washing liquid, or close to the concentration of the acid gas absorption component in the washing liquid.

A tenth aspect is the acid gas removal method according to the eighth or ninth aspect, in which, at the finish reclaiming step, pressure control of regulating pressure in the reclaimer is performed such that a reference temperature is maintained, the reference temperature being a temperature in the reclaimer at the time when the introduction of the lean extraction solution into the reclaimer is stopped as a reference temperature.

Advantageous Effects of Invention

The present invention can reduce the operating time necessary for recovering the absorption component in the residue in the reclaiming device to the same concentration, in comparison with the supply condition in which only the supply water is supplied and no washing liquid is supplied, when a washing liquid circulating in a water wash section of the acid gas absorption tower recovering the acid gas is initially supplied in a finish reclaiming operation of recovering the remaining absorption component after the supply of the lean extraction solution to the reclaimer is stopped.

In addition to the control of the supply water, the pressure of the reclaiming device is controlled, and the pressure of the reclaimer is regulated such that the temperature of the reclaimer is maintained at a predetermined reference temperature. This can reduce the operating time necessary for recovering the absorption component in the residue in the reclaimer to the same concentration.

BRIEF DESCRIPTION OF DRAWINGS

FIG. 9 is a flowchart of control of the reclaiming device according to the third embodiment.

DESCRIPTION OF EMBODIMENTS

Preferred embodiments of the present invention will now be described in detail with reference to attached drawings. The present invention is not limited to the embodiments and, when there are a plurality of embodiments, structures formed of combinations of the embodiments are also included in the embodiments.

First Embodiment

Figure 1:
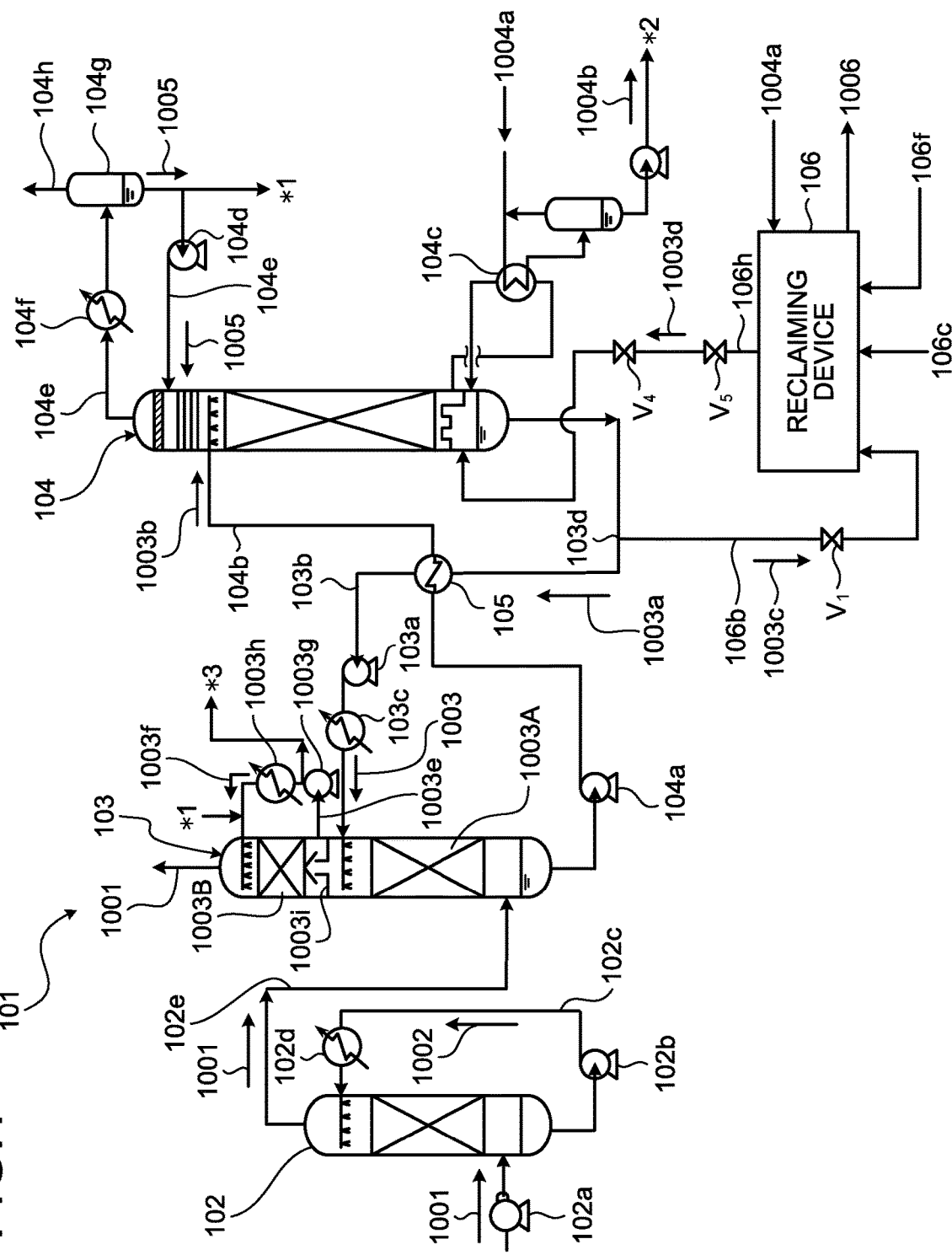
FIG. 1 is a schematic diagram of a recovery apparatus according to a first embodiment.

FIG. 1 is a schematic diagram of a recovery apparatus according to a first embodiment. Coal gasified gas, synthesis gas, coke-oven gas, petroleum gas, natural gas, and the like include acid gas, such as $CO_2$ (carbon dioxide) and $H_2S$ (hydrogen sulfide). As illustrated in FIG. 1, such a recovery apparatus recovering $CO_2$ (carbon dioxide) and/or $H_2S$ (hydrogen sulfide) and such a recovery apparatus recovering $CO_2$ (carbon dioxide) from combustion flue gas (hereinafter referred to as "flue gas") include a cooling tower 102, an absorption tower 103, and a regeneration tower 104. The cooling tower 102 cools flue gas 1001 discharged from industrial equipment, such as a boiler, with cooling water 1002. The absorption tower 103 causes absorbing liquid 1003 (lean solution 1003a) serving as an amine-based absorbing liquid that absorbs $CO_2$, such as an alkanolamine aqueous solution, to countercurrent contact with the flue gas 1001 to cause $CO_2$ in the flue gas 1001 to be absorbed into the absorbing liquid 1003 and discharges the flue gas 1001 from which $CO_2$ has been removed. The regeneration tower 104 regenerates the absorbing liquid 1003 (rich solution 1003b) in which $CO_2$ is absorbed.

In the cooling tower 102, the flue gas 1001 including $CO_2$ is pressurized by an flue gas blower 102a, thereafter sent into the cooling tower 102, and subjected to countercurrent contact with cooling water 1002 to be cooled (flue gas cooling step). The cooling water 1002 is accumulated in a lower portion in the cooling tower 102 and supplied to an upper portion in the cooling tower 102 through a cooling water pipe 102c outside the cooling tower 102 by a humidification cooling water circulation pump 102b. The cooling water 1002 is subjected to countercurrent contact with the flue gas 1001 in the process of reaching the lower portion in the cooling tower 102. The cooling water pipe 102c is provided with a cooling device 102d that cools the cooling water 1002. The cooled flue gas 1001 is discharged from the cooling tower 102 through a flue gas pipe 102e and supplied to the absorption tower 103.

In the absorption tower 103, in an absorption unit 1003A, the flue gas 1001 is subjected to countercurrent contact with an alkanolamine-based absorbing liquid 1003 (lean solution 1003a) to cause $CO_2$ in the flue gas 1001 to be absorbed into the absorbing liquid 1003. In this manner, $CO_2$ is removed from the flue gas 1001 ($CO_2$ removal step). The flue gas 1001 from which $CO_2$ has been removed is subjected to gas-liquid contact with a washing liquid 1003f that circulates through a circulation line 1003e in a water wash section 1003B provided on the gas flow downstream side of the absorption unit 1003A, and a $CO_2$ absorption component accompanying the gas from which $CO_2$ has been removed is recovered by the washing liquid 1003f. Thereafter, the flue gas 1001 is discharged to the outside of the system from a top portion of the absorption tower 103. A reference numeral 1003g denotes a circulation pump that circulates the washing liquid 1003f, a reference numeral 1003h denotes a cooling device that cools the washing liquid 1003f, and a reference numeral 1003i denotes a washing liquid storage that stores the washing liquid.

The absorbing liquid 1003 (lean solution 1003a) is pressurized by an absorbing liquid supply pump 103a from the regeneration tower 104, and supplied from the outside of the absorption tower 103 through a lean solution pipe 103b to an upper portion in the absorption tower 103. Thereafter, the absorbing liquid 1003 is subjected to countercurrent contact with the flue gas 1001 in the process of reaching a lower portion in the absorption tower 103. The lean solution pipe 103b is provided with a cooling device 103c that cools the absorbing liquid 1003 supplied to the absorption tower 103. The absorbing liquid 1003 (rich solution 1003b) having $CO_2$ absorbed therein is accumulated in the lower portion in the absorption tower 103, discharged through a rich solution pipe 104b to the outside of the absorption tower 103, and supplied to an upper portion in the regeneration tower 104 while being pressurized by an absorbing liquid discharge pump 104a.

In the regeneration tower 104, the rich solution 1003b of the absorbing liquid 1003 is changed to a semi-lean solution from which the most part of $CO_2$ has been discharged by endothermic reaction, and the semi-lean solution is changed to a lean solution 1003a from which substantially whole $CO_2$ has been removed when the solution reaches the lower portion in the regeneration tower 104.

In the lower portion in the regeneration tower 104, the lean solution 1003a is heated and regenerated using saturated steam 1004a by a reboiler 104c. Thereafter, the regenerated lean solution 1003a is discharged through a lean solution pipe 103b to the outside of the regeneration tower 104 and, in the process of being supplied to the absorption tower 103, cooled by being subjected to heat exchange performed by a rich-lean heat exchanger 105, in which heat is exchanged between the regenerated lean solution 1003a and the rich solution 1003b in the process of being supplied through the rich solution pipe 104b to the regeneration tower 104 (absorbing liquid regeneration step).

By contrast, in the upper portion in the regeneration tower 104, $CO_2$ gas separated from the rich solution 1003b and the semi-lean solution is discharged from the top portion of the regeneration tower 104 through a reflux pipe 104e to the outside of the regeneration tower 104 while contacting reflux water 1005 pressurized by a reflux water pump 104d from the outside of the regeneration tower 104. In the process of passing through the reflux pipe 104e, the $CO_2$ gas is cooled by a regeneration tower reflux cooling device 104f, thereafter the vapor is condensed by a $CO_2$ separator 104g, and the $CO_2$ gas is separated from the reflux water 1005 and guided to a $CO_2$ recovery step by a recovery $CO_2$ discharge pipe 104h. The reflux water 1005 separated from $CO_2$ by the $CO_2$ separator 104g is pressurized by the reflux water pump 104d and supplied through the reflux pipe 104e to the regeneration tower 104. Part of the reflux water 1005 is introduced into a circulation line 1003e of the water wash section 1003B of the absorption tower 103 (*1), and joins the washing liquid 1003f.

Although not illustrated in the drawings, an upstream side of the cooling tower 102 of a recovery apparatus 101 is provided with a denitration apparatus that performs a denitration step in which denitration is performed by reducing $NO_x$ (nitrogen oxide) included in the flue gas 1001, and a desulfurization apparatus that performs a desulfurization step in which desulfurization is performed by bringing $SO_x$ (sulfur oxide) included in the flue gas 1001 into contact with calcium sulfate in the slurry.

In the recovery apparatus 101 described above, in the operation of recovering $CO_2$ in the flue gas 1001, alkanolamine is degraded due to oxygen to generate heat stable salt. In addition, $NO_x$ remaining without being removed at the denitration step and/or $SO_x$ remaining without being removed at the desulfurization step or the like reacts with alkanolamine included in the absorbing liquid 1003 at the $CO_2$ removal step and generates heat stable salt. The heat stable salt is included as degradation products in the absorbing liquid 1003 together with solids, such as soot and dust included in the flue gas 1001, and is not removed under ordinary conditions at the absorbing liquid regeneration step of regenerating the lean solution 1003a from the rich solution 1003b. As a result, because the absorbing liquid 1003 including degradation products circulates in the system of the recovery apparatus, degradation products gradually accumulate in the system. For this reason, the recovery apparatus 101 includes a reclaiming device 106 reclaiming the degradation products remaining in the lean solution 1003a generated in the regeneration tower 104, as a reclaiming residue (hereinafter referred to as a "residue") 1006 obtained by heating and condensing the degradation products. The residue is formed of a solid component that is a condensed non-volatile component in a lean extraction solution 1003c and a liquid component that is a non-condensed non-volatile component therein.

Figure 2:
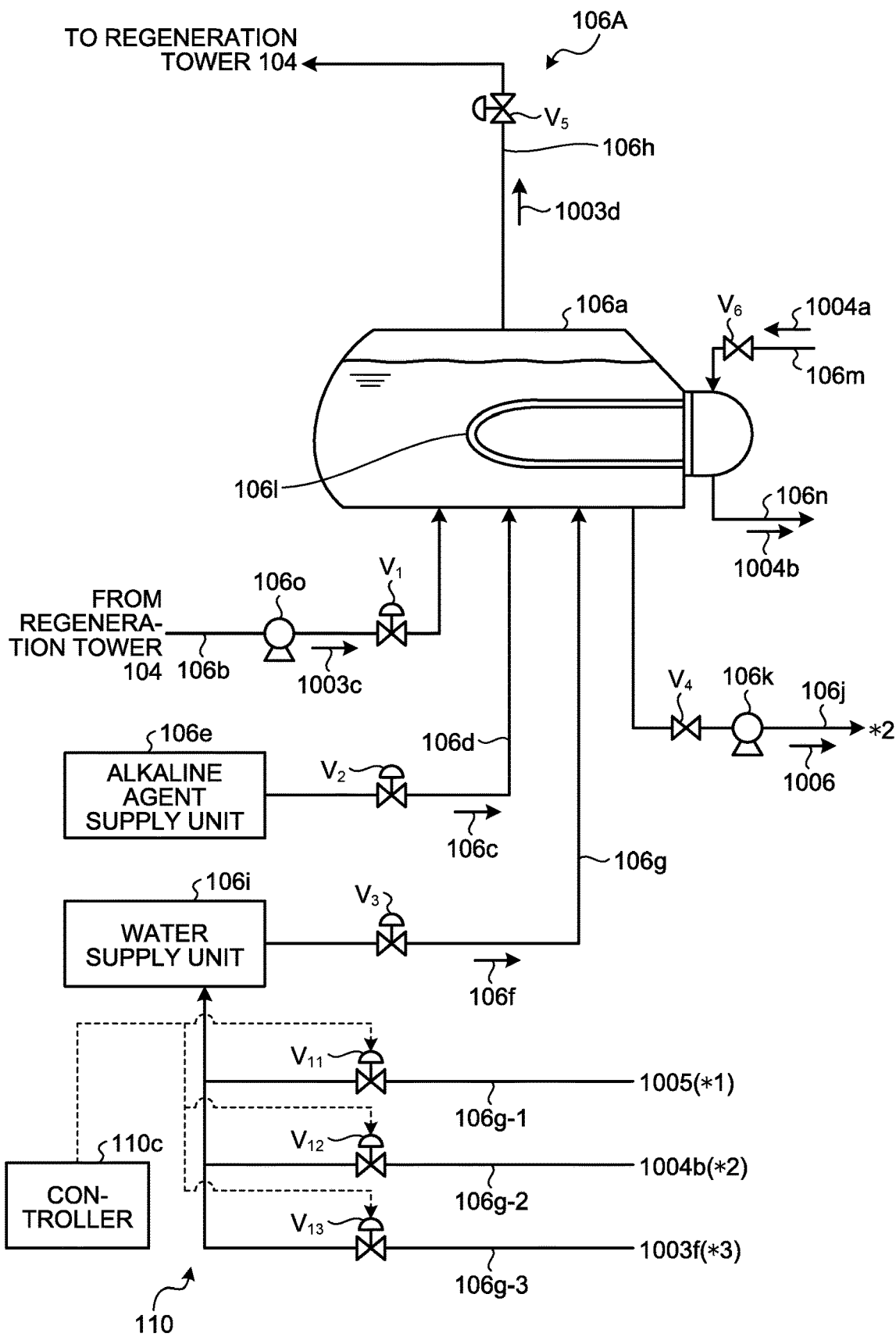
FIG. 2 is a schematic diagram of a reclaiming device according to the first embodiment.

FIG. 2 is a schematic diagram of the reclaiming device according to the first embodiment. As illustrated in FIG. 2, a reclaiming device 106A is a pressurizing-type reclaiming device and includes a reclaimer 106a, an alkaline agent supply pipe 106d, a water supply pipe 106g, and a reclaimer control device 110. The reclaimer 106a branches the lean solution 1003a regenerated by the regeneration tower 104 of the recovery apparatus 101 that recovers $CO_2$ of acid gas components in the flue gas 1001 with the absorbing liquid 1003, extracts the branched lean solution 1003a as the lean extraction solution 1003c, and introduces and stores the lean extraction solution 1003c. The alkaline agent supply pipe 106d supplies alkaline agent 106c to the inside of the reclaimer 106a. The water supply pipe 106g supplies supply water (such as regeneration tower reflux water (reflux water), steam condensate, and desalinated water) 106f to the inside of the reclaimer 106a. The reclaimer control device 110 regulates control of introduction of the supply water 106f to be supplied to a water supply unit 106i.

The reclaiming device 106A extracts the lean solution 1003a as the lean extraction solution 1003c from a branch portion 103d of the lean solution pipe 103b positioned in a portion before reaching the rich-lean heat exchanger 105 from the regeneration tower 104, and stores the lean extraction solution 1003c in the reclaimer 106a. The reclaiming device 106A heats the lean extraction solution 1003c in a pressurized state at high temperature (for example, 120° C. to 150° C.), returns the absorption component vaporized from the lean extraction solution 1003c as recovered vapor 1003d to the lower portion of the regeneration tower 104, and discharges the residue 1006 condensed by heating.

The reclaiming device 106A mainly includes absorbing liquid storage and a heating unit. As illustrated in FIG. 2, the absorbing liquid storage is formed as the reclaimer 106a serving as a closed vessel for storing the lean extraction solution 1003c as part of the lean solution 1003a regenerated by the regeneration tower 104 by recovering $CO_2$ from the flue gas 1001. The reclaimer 106a is connected, via an extraction pipe 106b, with the branch portion 103d of the lean solution pipe 103b located at a portion before reaching the rich-lean heat exchanger 105 from the regeneration tower 104. The extraction pipe 106b is provided with an on-off valve $V_1$ and an extraction pump 106o.

The reclaimer 106a is also connected with the alkaline agent supply pipe 106d that feeds the alkaline agent 106c from an alkaline agent supply unit 106e. The alkaline agent supply pipe 106d is provided with an on-off valve $V_2$. The reclaimer 106a is also connected with the water supply pipe 106g that feeds supply water 106f from the water supply unit 106i. The water supply pipe 106g is provided with an on-off valve $V_3$. The reclaimer 106a is also connected with a residue discharge pipe 106j that discharges the residue 1006. The residue discharge pipe 106j is provided with an on-off valve $V_4$ and a residue discharge pump 106k. An upper portion of the reclaimer 106a is connected with a recovered vapor discharge pipe 106h that is connected with a connection portion 104i in the lower portion of the regeneration tower 104 and discharges the recovered vapor 1003d. The recovered vapor discharge pipe 106h is provided with an on-off valve $V_5$. Examples of the supply water 106f include regeneration tower reflux water (reflux water), steam condensate, and desalinated water.

The heating unit includes U-shaped vapor pipes 106l provided inside the reclaimer 106a and mounted transversely, a vapor supply pipe 106m, and a condensate discharge pipe 106n. The vapor supply pipe 106m is connected to one end of each vapor pipe 106l and supplies saturated steam 1004a generated by heating by a heat source (not illustrated) outside the reclaimer 106a. The condensate discharge pipe 106n is connected to the other end of each vapor pipe 106l and discharges steam condensate 1004b to the outside of the reclaimer 106a.

The reclaiming device 106A opens the on-off valve $V_1$ to supply the lean extraction solution 1003c to the inside of the reclaimer 106a, opens the on-off valve $V_2$ to supply the alkaline agent 106c from the alkaline agent supply unit 106e to the inside of the reclaimer 106a, opens the on-off valve $V_3$ to supply the supply water 106f from the water supply unit 106i to the inside of the reclaimer 106a, and opens the on-off valve $V_6$ to cause the saturated steam 1004a to run through the vapor pipe 106l. In this manner, the reclaiming device 106A heats the lean extraction solution 1003c and the supply water 106f that are supplied thereto by subjecting them to heat exchange in a non-contact manner at, for example, 120° C. to 150° C. In this manner, degradation products serving as non-volatile substances and included in the lean extraction solution 1003c is separated from the absorption component with generation of salt with the alkaline agent 106c and condensed as the residue 1006 in the bottom portion of the reclaimer 106a.

The residue 1006 includes liquid components (the absorption component that failed to be recovered, the alkaline agent, the liquid components including the supply water, and the liquid components of the non-volatile substances) in the reclaimer 106a, and the solid components of the non-volatile components. The residue 1006 is discharged to the outside of the reclaimer 106a by opening the on-off valve $V_4$ and operating the residue discharge pump 106k and recovered outside the system of the recovery apparatus 101. The recovered residue 1006 is treated by incineration or the like.

By contrast, the lean extraction solution 1003c and the supply water 106f are vaporized by heating. In this operation, the amine-based absorption component that has become free by decomposition of the alkaline agent 106c is vaporized by heating. The recovered vapor 1003d accompanied by the vaporized absorption component passes through the opened on-off valve $V_5$ and is returned to the regeneration tower 104 through the recovered vapor discharge pipe 106h. In this manner, the degradation products included in the lean extraction solution 1003c is separated, and this can prevent degradation products from accumulating in the absorbing liquid that circulates in the system of the recovery apparatus 101.

The following describes the principle of reclaiming using an amine-based absorbing liquid as the absorption component and using sodium hydroxide as the alkaline agent. The alkaline agent 106c, such as sodium hydroxide is added and mixed to the lean extraction solution 1003c including impurities and the absorption component (including amine nitrate and/or amine sulfate) fixed with part of impurities (for example, including nitrate and/or sulfate), and the mixture is heated. In this manner, the amine absorption component that has become a free state is recovered as the recovered vapor 1003d together with water, and the non-volatile substances (impurities: including sodium nitrate and/or sodium sulfate) are separated and discharged to the outside of the system as the residue (liquid, solid) 1006.

In a reclaiming operation by only heating as in conventional technology, there is the possibility that part of the absorption component is not vaporized from the lean extraction solution and remains in the residue. For this reason, recovery of the absorption component as the recovered vapor may be insufficient and there is the concern of a loss of the absorption component.

For this reason, the reclaiming device 106A according to the present embodiment includes the reclaimer control device 110, as illustrated in FIG. 2.

The reclaimer control device 110 manages introduction of supply water to be introduced into the water supply unit 106i serving as a supply source of the supply water 106f to be supplied to the reclaimer 106a. Water supply pipes 106g-1 to 106g-3 are provided with a controller 110c that operates the degree of opening of each of on-off valves $V_{11}$ to $V_{13}$ provided on the respective water supply pipes 106g-1 to 106g-3, in accordance with the operating status.

Figure 3:
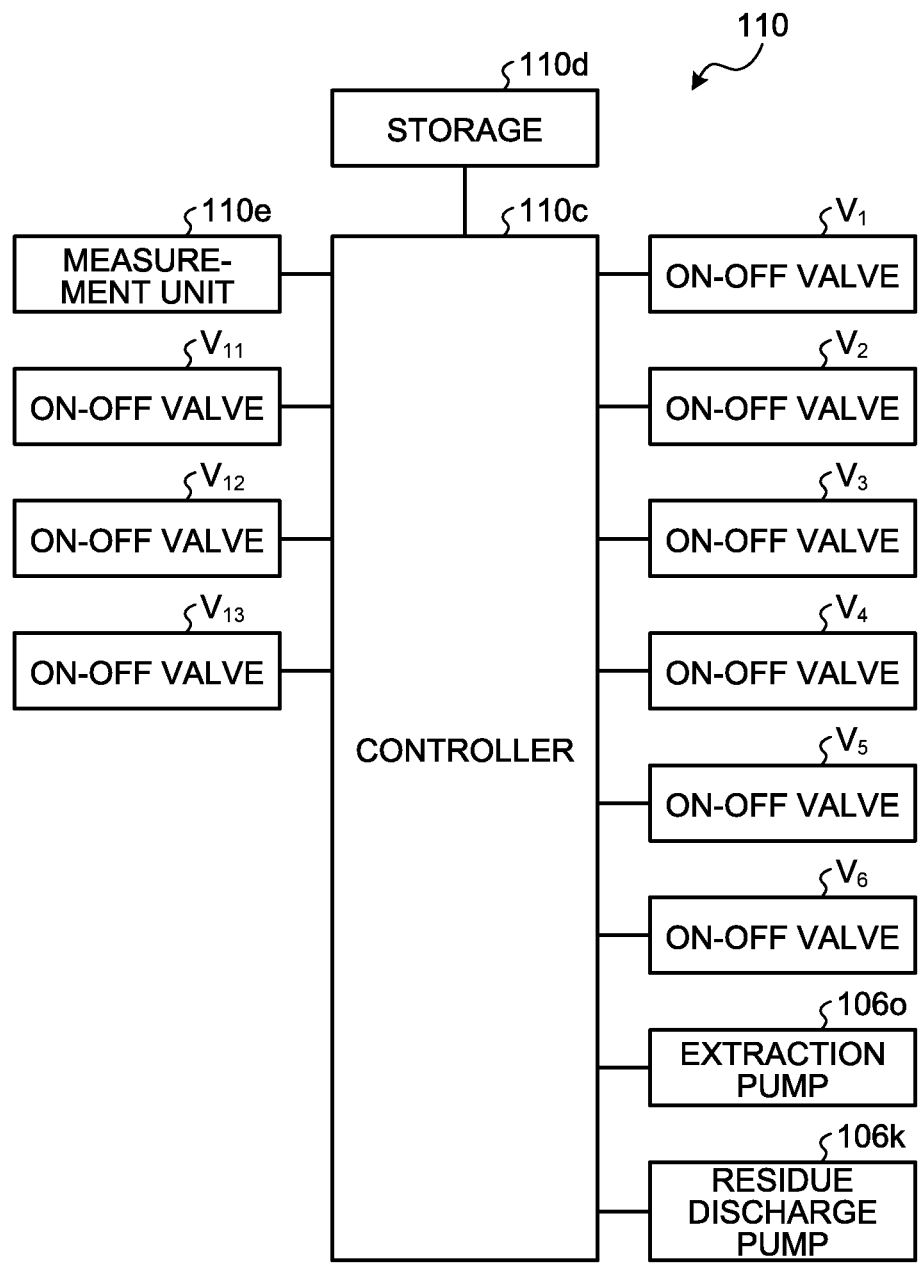
FIG. 3 is a block diagram of a control system of the reclaiming device according to the first embodiment.
Figure 4:
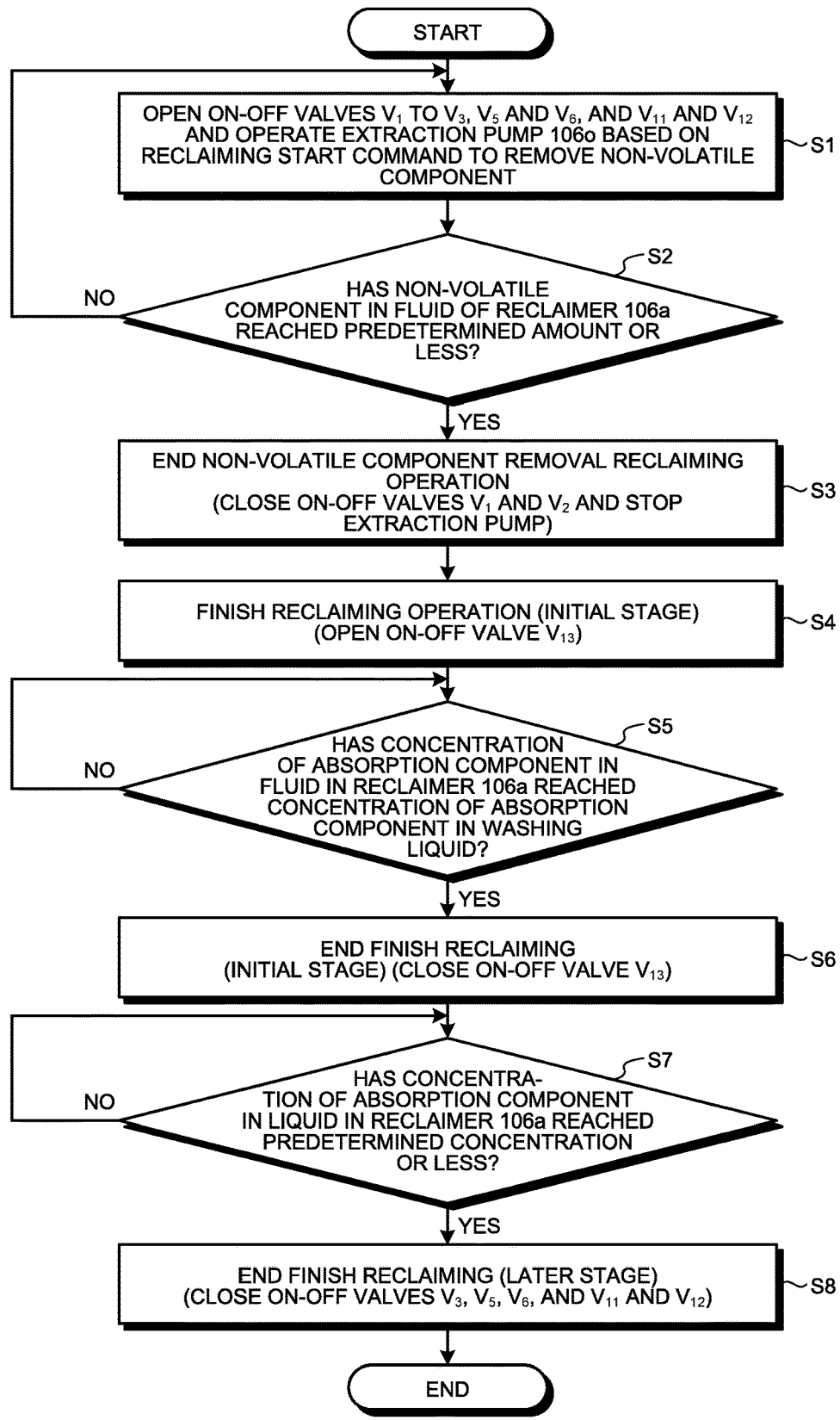
FIG. 4 is a flowchart of control of the reclaiming device according to the first embodiment.

FIG. 3 is a block diagram of the control system of the reclaiming device according to the first embodiment. FIG. 4 is a flowchart of the control of the reclaiming device according to the first embodiment. The controller 110c is composed of a microcomputer or the like. As illustrated in FIG. 3, the controller 110c is provided with storage 110d. The storage 110d is composed of an RAM, an ROM, and the like, and stores computer programs and/or data therein. The storage 110d stores therein component quantities of non-volatile substances (impurities: such as sodium nitrate and sodium sulfate) in the absorbing liquid (for example, the lean solution 1003a and/or the lean extraction solution 1003c) and data (absorption component amount data 1 and absorption component amount data 2) on the absorption component amount in the lean extraction solution 1003c stored in the reclaimer 106a, to operate the reclaiming device 106A.

As the absorption component amount data 1, the amount (difference x−y=z) to reduce, when the content of the non-volatile substances in the lean solution 1003a measured by a measurement unit 110e exceeds a predetermined amount (x), the non-volatile substances from the exceeding amount (x) to a reference value (y) or less is set. The setting is an index indicating the extent to which the non-volatile substances is to be removed in the circulating lean solution 1003a, and can be set as desired.

As the absorption component amount data 2, for example, the absorption component amount remaining in the lean extraction solution 1003c is set. For example, a predetermined concentration (for example, several wt %) of the absorption component or a predetermined recovery amount (recovery rate) of the absorption component is set. The setting is an index indicating the extent to which the remaining absorption component has been reduced in the lean extraction solution 1003c stored in the reclaimer 106a, and can be set as desired.

In addition, as illustrated in FIG. 3, the controller 110c is connected with the measurement unit 110e, the on-off valves $V_1$ to $V_4$ and $V_{11}$ to $V_{13}$, and the pumps 1060 and 106k. The controller 110c integrally controls the on-off valves $V_1$ to $V_6$ and $V_{11}$ to $V_{13}$ and the pumps 106o and 106k described above, in accordance with the computer programs and/or data stored in advance in the storage 110d.

As illustrated in FIG. 4, the controller 110c opens the on-off valves $V_1$ to $V_3$, $V_5$, and $V_6$ and operates the extraction pump 106o, based on a reclaiming start command to remove the non-volatile component (Step S1). In this manner, part of the absorbing liquid 1003 is introduced into the reclaimer 106a as the lean extraction solution 1003c from part of the lean solution 1003a and stored therein, heated together with the alkaline agent 106c and the supply water 106f and vaporized, and returned as the recovered vapor 1003d to the regeneration tower 104 through the recovered vapor discharge pipe 106h.

In the reclaiming to remove the non-volatile component, first supply water control is performed. In the first supply water control, both or one of the on-off valves $V_{11}$ and $V_{12}$ is opened such that, as first supply water to be supplied to the water supply unit 106i, any of the reflux water 1005 (*1) from the regeneration tower 104 and the steam condensate 1004b (*2) is supplied as the supply water 106f. In the operation, desalinated water may be supplied separately.

Thereafter, based on non-volatile component removal information that is input from the measurement unit 110e, when the controller 110c determines that the non-volatile component in the liquid of the reclaimer 106a has become the predetermined amount or less and removed (Yes at Step S2), the controller 110c closes the on-off valves $V_1$ and $V_2$ and stops the extraction pump 106o, to finish the reclaiming operation of removing the non-volatile component (Step S3). The concentration of the absorption component in the reclaimer 106a when the reclaiming operation of removing the non-volatile component is finished is preferably a concentration (for example, 30 to 60 wt %) substantially equal to or slightly lower than that of the lean solution 1003a circulating in the system, from the viewpoint of recovery of the absorption component, although it differs depending on the type of the absorption component and the operation conditions of the absorption device.

Thereafter, based on a finish reclaiming start command to recover the absorption component from the residue 1006, the controller 110c keeps the on-off valves $V_3$, $V_5$, $V_6$, and $V_{11}$ to $V_{12}$ opened, further opens the on-off valve $V_{13}$, and introduces the washing liquid 1003f (*3) into the water supply unit 106i (Step S4). In this manner, the second supply water control is performed. In the second supply water control, the supply amount of the supply water 106f to be supplied to the reclaimer 106a is increased, and the increased supply water is supplied as the supply water 106f. In this manner, a vapor generation amount in the reclaimer 106a can be increased.

In this state, because the absorption component in the $CO_2$ absorbing liquid of the water wash section is included in the washing liquid 1003f, it is determined whether the concentration of the absorption component in the liquid reaches the concentration of the absorption component in the washing liquid 1003f (Step S5).

At the finish reclaiming (initial stage), when the concentration of the absorption component in the liquid in the reclaimer 106a reaches the concentration of the absorption component in the washing liquid 1003f (Yes at Step S5), the controller 110c performs third supply water control of closing the on-off valve $V_{13}$ to supply the liquid as the supply water 106f and finishes the operation of the finish reclaiming (initial stage) (Step S6). This is because the absorption component at a low concentration is included in the washing liquid 1003f by cleaning in the water wash section 1003B, no absorption component can be recovered even if more washing liquid is supplied when the concentration reaches the concentration of the absorption component in the washing liquid 1003f.

In the operation of finish reclaiming (later stage), when the concentration of the absorption component in the liquid of the reclaimer 106a reaches a predetermined recovery target concentration (for example, several wt %) or less (Yes at Step S7), the on-off valves $V_3$, $V_5$, $V_6$, and $V_{11}$ and $V_{12}$ are closed to finish the operation of the finish reclaiming (later stage) (Step S8).

After the finish reclaiming operation is finished, the controller 110c opens the on-off valve $V_4$ and operates the residue discharge pump 106k. In this manner, the residue 1006 is discharged to the outside of the reclaimer 106a.

Figure 5:
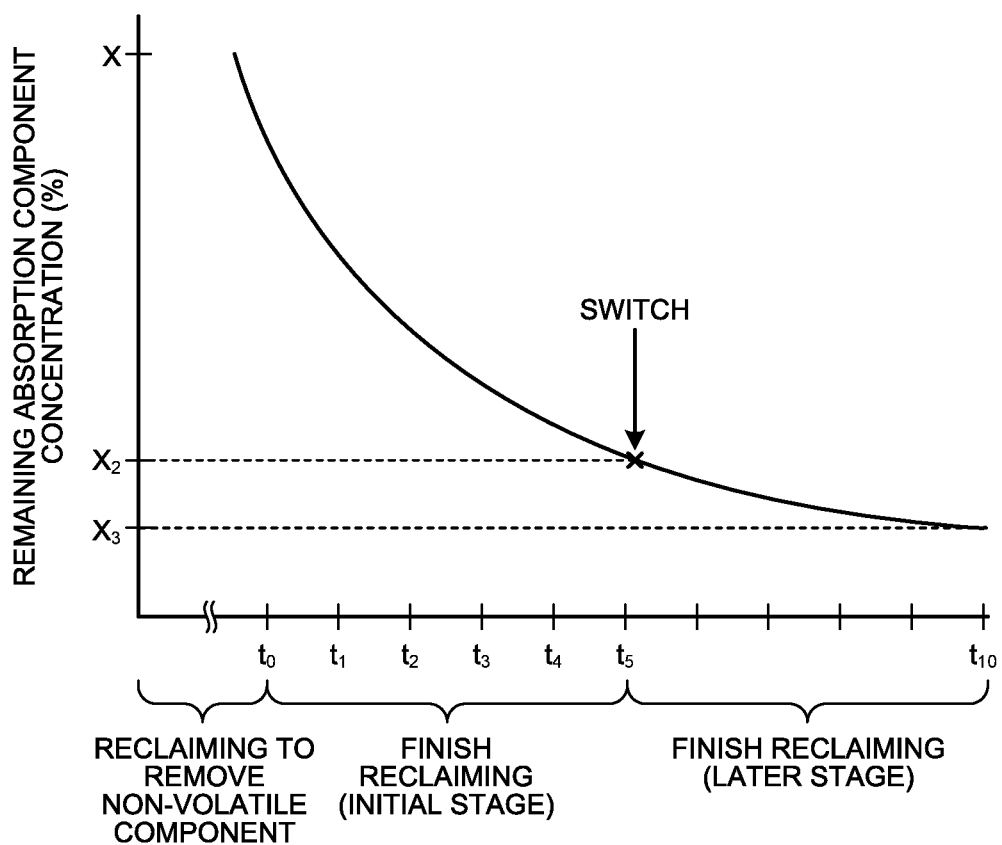
FIG. 5 is a diagram illustrating relation between the operating time of a reclaimer and the concentration of a residual absorption component.

FIG. 5 is a diagram illustrating relation between the operating time of the reclaimer and the concentration of the remaining absorption component. FIG. 5 illustrates relation between the operating time of the reclaimer (t) and the concentration of the remaining absorption component (%) in the case where the reclaimer is operated with the pressure in the reclaimer 106a fixed. In FIG. 5, the time $t_0$ of the horizontal axis indicates the time when the lean extraction solution 1003c is stopped, the time $t_1$ to $t_5$ indicates the operation-elapsed time of the finish reclaiming (initial stage) operation, and the time $t_6$ to $t_{10}$ indicates the operation-elapsed time of the finish reclaiming (later stage) operation. The part before $t_0$ in the horizontal axis indicates the reclaiming operation to remove the non-volatile component.

As illustrated in FIG. 5, when the concentration of the absorption component at the time when extraction of the lean extraction solution 1003c is $X_1$, the concentration of the absorption component decreases by the reclaiming operation. When the concentration (X) of the absorption component in the residue reaches the concentration ($X_2$) of the absorption component in the washing liquid 1003f or becomes close to the concentration of the acid gas absorption component, switching of implementation of the second supply water control and the third supply water control is performed. The final concentration ($X_3$) of the absorption component in the washing liquid 1003f of the finish reclaiming (later stage) is a predetermined recovery target concentration (for example, several wt %) and properly set in accordance with the recovery target.

As described above, in the absorption component recovery operation performed after the extraction of the lean extraction solution 1003c to the reclaimer 106a is stopped, when the washing liquid 1003f circulating in the water wash section 1003B is supplied at the initial stage, the operating time necessary for recovering the absorption component in the residue 1006 in the reclaiming device 106A to the same concentration (for example, 90% recovery) is reduced by approximately 5%, in comparison with the supply condition in which only the supply water (reflux water 1005 and/or steam condensate 1004b) is supplied without supplying the washing liquid.

The acid gas removal method according to the present embodiment includes an acid gas removal step of removing $CO_2$ using the absorption tower 103 that removes acid gas in the gas 1001 by bringing the acid gas into contact with the acid gas absorbing liquid and the regeneration tower 104 that regenerates, using vapor of the reboiler 104c, the rich solution 1003b having $CO_2$ absorbed therein as the lean solution 1003a, a non-volatile component removal reclaiming step of extracting part of the lean solution 1003a regenerated by the regeneration tower 104, continuously introducing and storing the extracted lean extraction solution 1003c into the reclaimer 106a, introducing the alkaline agent 106c and the supply water 106f into the reclaimer to heat the lean extraction solution with them, and recovering the remaining absorption component from the lean extraction solution 1003c as the recovered vapor 1003d while separating the non-volatile component in the lean extraction solution 1003c, a step of stopping the introduction of the lean extraction solution 1003c into the reclaimer 106a, and a finish reclaiming step of further recovering the absorption component from the residue 1006 in the reclaimer 106a. In the non-volatile component removal reclaiming, the first supply water control is performed in which at least one of the reflux water 1005 from the regeneration tower 104, the steam condensate 1004b, and desalinated water is supplied to the reclaimer 106a as the first supply water to be supplied to the water supply pipe. At the initial stage of the finish reclaiming, the second supply water control is performed in which at least one of the reflux water 1005, the steam condensate 1004b, and desalinated water is supplied to the reclaimer 106a as the first supply water, and the washing liquid 1003f including the $CO_2$ absorbing liquid of the water wash section 1003B of the absorption tower 103 is supplied to the reclaimer 106a as the second supply water. At the later stage of the finish reclaiming, the third supply water control is performed in which supply of the second supply water is stopped and at least one of the reflux water 1005, the steam condensate 1004b, and desalinated water is supplied as the first supply water.

The reclaiming method can reduce the operating time necessary for recovering the absorption component discharged to the outside of the system together with the residue of the reclaiming device and improves efficiency of the operation of the reclaiming device.

Second Embodiment

Figure 6:
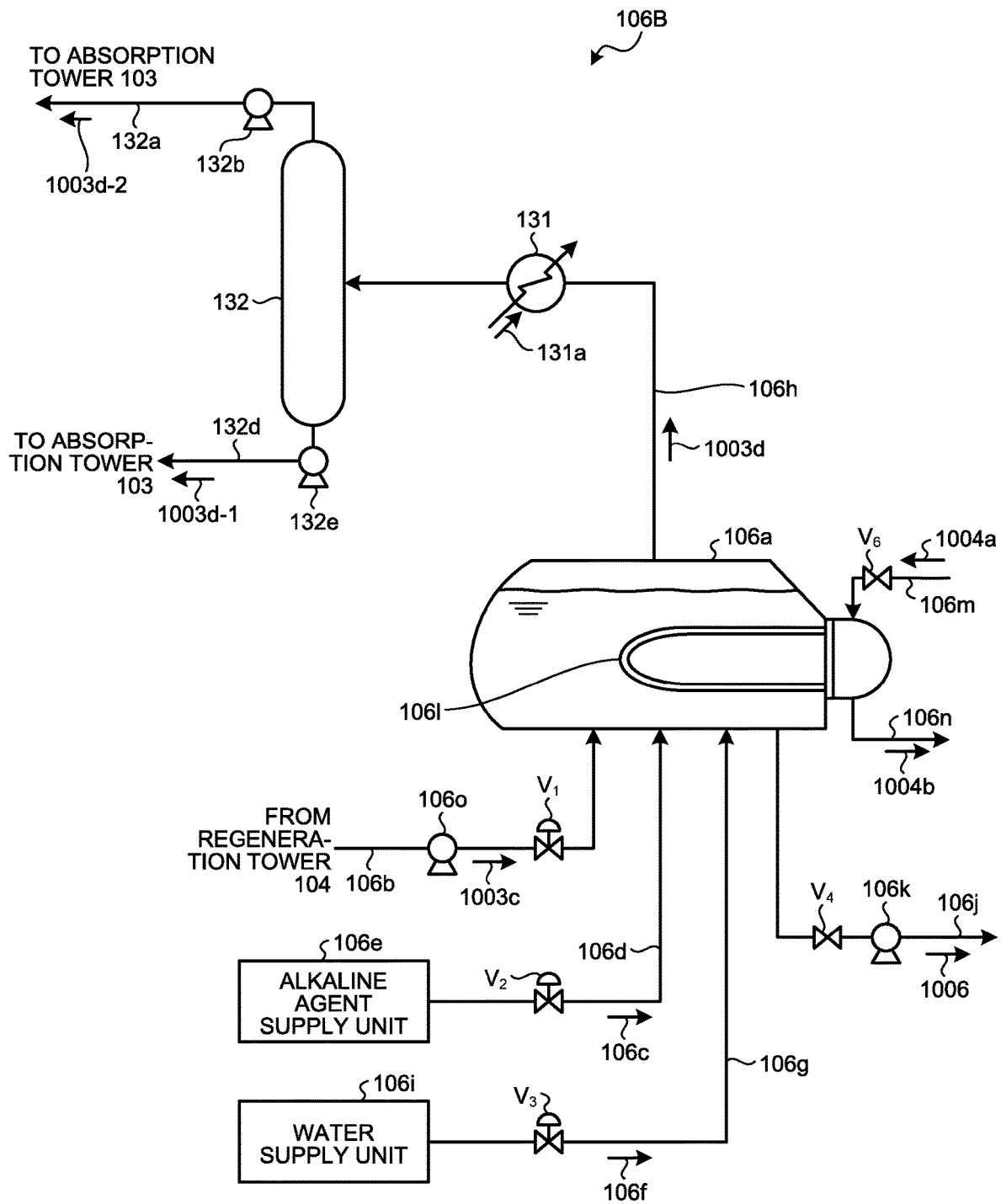
FIG. 6 is a schematic diagram of a reclaiming device according to a second embodiment.

FIG. 6 is a schematic diagram of a reclaiming device according to the second embodiment. The same members as those of the reclaiming device illustrated in the first embodiment will be denoted by the same reference numerals, and an explanation thereof will be omitted. The reclaiming device 106A illustrated in FIG. 2 is a pressurizing type reclaiming device, but the present invention is not limited thereto. The reclaiming device may be a vacuum type reclaiming device. As illustrated in FIG. 6, in the reclaiming device 106B according to the present embodiment, the recovered vapor discharge pipe 106h that discharges the recovered vapor 1003d from the reclaimer 106a is provided with a heat exchanger 131 and a gas-liquid separator 132. After the temperature of the recovered vapor 1003d discharged from the reclaimer 106a and accompanied by the absorption component is reduced to, for example, 50° C. to 100° C. by cooling water 131a of the heat exchanger 131, the recovered vapor 1003d is introduced into the gas-liquid separator 132 and flashed. Thereafter, the introduced recovered vapor 1003d is separated into condensate liquid 1003d-1 and recovered vapor condensate liquid separated gas 1003d-2 in the gas-liquid separator 132. The recovered vapor condensate liquid separated gas 1003d-2 is supplied to the absorption tower 103 by a compressor 132b provided in a discharge line 132a. The condensate liquid 1003d-1 is supplied to the absorption tower 103.

The pressurizing type reclaiming device is used for absorption components having a boiling point of, for example, 200° C. or less, but absorption components having a high boiling point exceeding 200° C. also exist. In the case of recovering an absorption component having such a high boiling point, not the pressurizing type, but the vacuum type reclaiming device using, for example, a decompressor, such as a vacuum pump, is adopted. The absorption component having a high boiling point is suitable for the case of removing an acid component in high-pressure process gas. In the case of using the pressurizing type reclaiming device, the absorption component deteriorates due to high temperature, and the reclaiming cost increases because use of high-temperature vapor is required. For this reason, the vacuum type reclaiming device is used to inhibit them.

Also in the vacuum type reclaiming device 106B, the operation of supplying the supply water 106f is the same as that in the pressurizing type reclaiming device 106A.

Also in the present embodiment, in the absorption component recovery operation performed after the extraction of the lean extraction solution 1003c to the reclaimer 106a is stopped, when the washing liquid 1003f circulating in the water wash section 1003B is supplied at the initial stage, the operating time necessary for recovering the absorption component in the residue 1006 in the reclaiming device 106B to the same concentration (for example, 90% recovery) is reduced by approximately 40%, in comparison with the supply condition in which only the supply water (reflux water 1005 and/or steam condensate 1004b) is supplied without supplying the washing liquid.

The reason why the reduction rate is improved in comparison with the first embodiment is that, in the case of recovering the absorption component having a high boiling point, the content rate of the absorption component at the time when extraction of the lean extraction solution 1003c is stopped is high, the content rate of the remaining absorption component and the vapor pressure greatly decrease with lapse of the operating time, and the recovery efficiency is improved by regulating the pressure of the reclaimer 106a by a decompressor 130.

Third Embodiment

Figure 7:
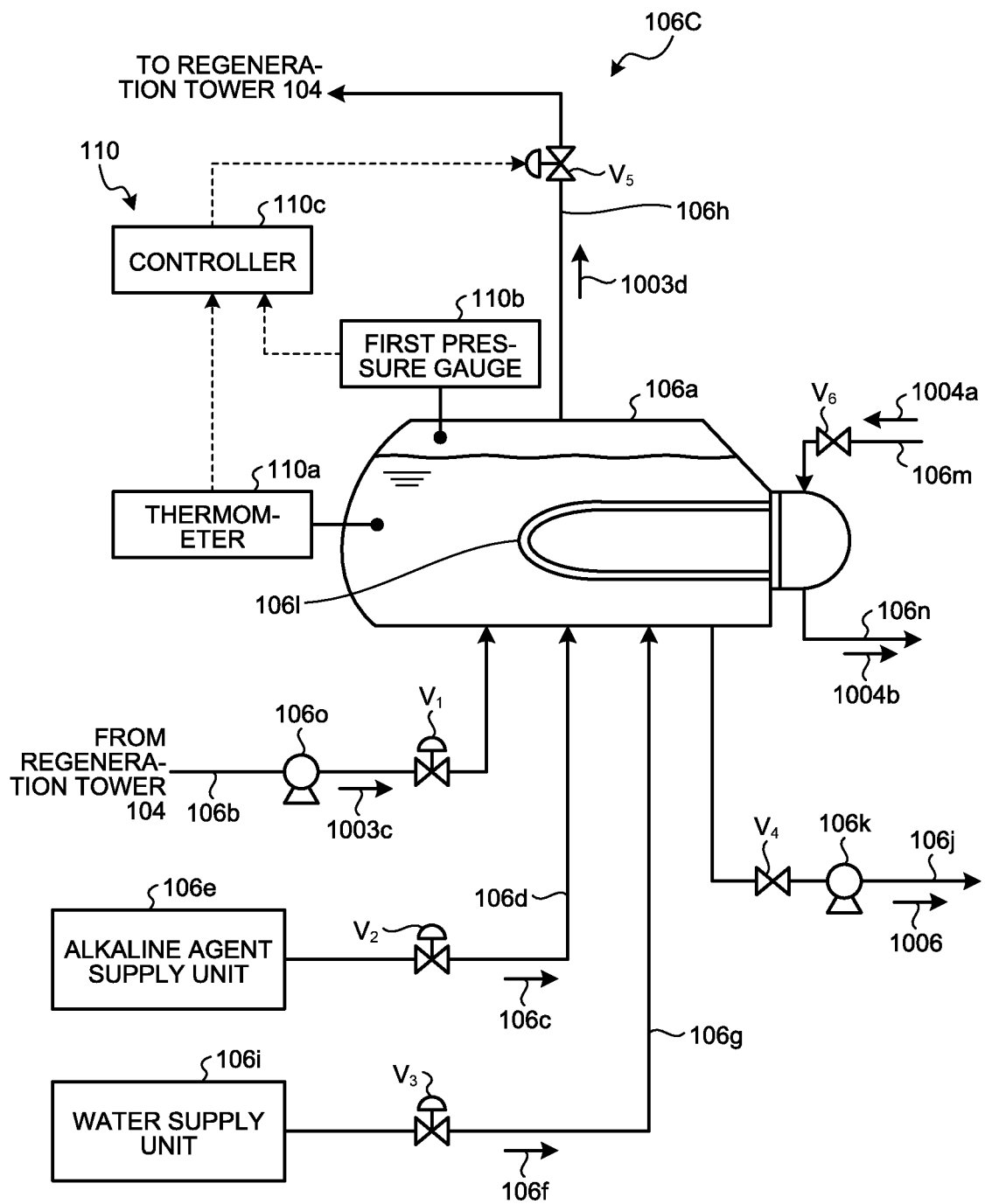
FIG. 7 is a schematic diagram of a reclaiming device according to a third embodiment.

FIG. 7 is a schematic diagram of a reclaiming device according to the third embodiment. The same members as those in the reclaiming devices illustrated in the first and the second embodiments will be denoted by the same reference numerals, and an overlapping explanation will be omitted. In the reclaiming device 106A according to the first embodiment, the supply water to be supplied to the water supply unit 106i is controlled to reduce the operating time necessary for recovering the absorption component in the residue 1006 in the reclaiming device 106A to the same concentration. In the present embodiment, in addition to the control of the supply water in the first embodiment, the pressure of the reclaiming device is controlled to reduce the operating time. In the present embodiment, the pressure control will be explained, and an explanation of the control of the supply water overlapping the first and the second embodiments will be omitted. Illustration of the supply water supplied to the water supply unit 106i in the present embodiment will be omitted (the same is applicable hereinafter).

As illustrated in FIG. 7, a reclaiming device 106C includes a thermometer 110a, a first pressure gauge 110b, and the controller 110c. The thermometer 110a measures the temperature of the liquid portion in the reclaimer 106a, the first pressure gauge 110b measures the pressure of the gas portion in the reclaimer 106a, and the controller 110c acquires data of the thermometer 110a and the first pressure gauge 110b and operates the degree of opening of the on-off valve $V_5$ provided for the recovered vapor discharge pipe 106h.

The controller 110c is composed of a microcomputer or the like.

Figure 8:
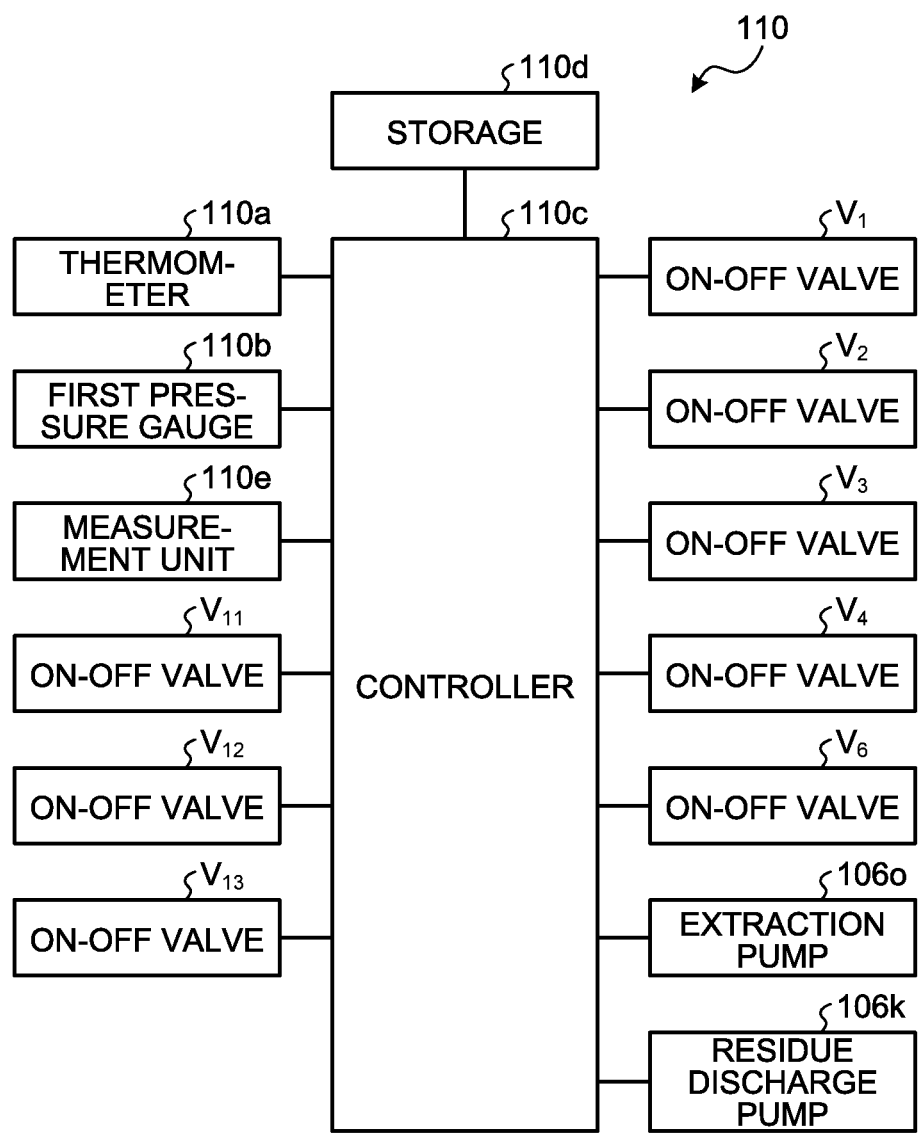
FIG. 8 is a block diagram of a control system of the reclaiming device according to the third embodiment.

As illustrated in FIG. 8, the controller 110c is provided with the storage 110d. The storage 110d is composed an RAM, an ROM, and the like, and stores computer programs and/or data therein. The storage 110d stores therein component quantities of non-volatile substances (impurities: such as sodium nitrate and sodium sulfate) in the absorbing liquid (for example, the lean solution 1003a and/or the lean extraction solution 1003c), and data (absorption component amount data 1 and absorption component amount data 2) on the absorption component amount in the lean extraction solution 1003c stored in the reclaimer 106a, to operate the reclaiming device 106A.

As the absorption component amount data 1, the amount (difference x−y=z) to reduce, when the content of the non-volatile substances in the lean solution 1003a measured by the measurement unit 110e exceeds the predetermined amount (x), the non-volatile substances from the exceeding amount (x) to a reference value (y) or less is set.

The setting is an index indicating the extent to which the non-volatile substances is to be removed in the circulating lean solution 1003a, and can be set as desired.

As the absorption component amount data 2, for example, the absorption component amount remaining in the lean extraction solution 1003c is set. For example, a predetermined concentration (for example, several wt %) of the absorption component or a predetermined recovery amount (recovery rate) of the absorption component is set.

The setting is an index indicating the extent to which the remaining absorption component has been reduced in the lean extraction solution 1003c stored in the reclaimer 106a, and can be set as desired.

In addition, as illustrated in FIG. 8, the controller 110c is connected with the thermometer 110a, the first pressure gauge 110b, the measurement unit 110e, the on-off valves $V_1$ to $V_6$, and the pumps 106o and 106k. The controller 110c integrally controls the on-off valves $V_1$ to $V_6$ and the pumps 106o and 106k described above, in accordance with the computer programs and/or data stored in advance in the storage 110d.

As illustrated in FIG. 9, the controller 110c opens the on-off valves $V_1$ to $V_3$, $V_5$, and $V_6$ and operates the extraction pump 106o, based on a reclaiming start command to remove the non-volatile component (Step S11). In this manner, part of the absorbing liquid 1003 is introduced into the reclaimer 106a as the lean extraction solution 1003c from part of the lean solution 1003a and stored therein, heated together with the alkaline agent 106c and the supply water 106f and vaporized, and returned as the recovered vapor 1003d to the regeneration tower 104 through the recovered vapor discharge pipe 106h.

Thereafter, based on non-volatile component removal information that is input from the measurement unit 110e, when the controller 110c determines that the non-volatile component in the liquid of the reclaimer 106a has become the predetermined amount or less and removed (Yes at Step S12), the controller 110c closes the on-off valves $V_1$ and $V_2$ and stops the extraction pump 106o, to finish the reclaiming operation of removing the non-volatile component (Step S13). The concentration of the absorption component in the reclaimer 106a when the reclaiming operation of removing the non-volatile component is finished is preferably a concentration (for example, 30 to 60 wt %) substantially equal to or slightly lower than that of the lean solution 1003a circulating in the system, from the viewpoint of recovery of the absorption component, although it differs depending on the type of the absorption component and the operation conditions of the absorption device.

Thereafter, based on a finish reclaiming start command to recover the absorption component from the residue 1006, the controller 110c keeps the on-off valves $V_3$, $V_5$, and $V_6$ opened, measures a first reference temperature $T_1$ with the thermometer 110a at the time when the extraction of the lean extraction solution 1003c is stopped, and continues heating while maintaining the first reference temperature $T_1$ (Step S14).

The controller 110c regulates the pressure in the reclaimer 106a based on the first reference temperature $T_1$ in the reclaimer 106a by proportional-integral differential controller (PID) control.

When the amount of the absorption component remaining in the residue decreases, the vapor pressure of the absorption component decreases, but the decrease in vapor pressure of the absorption component can be hindered by increasing the pressure so as to maintain the first reference temperature $T_1$. The pressure is increased, as an example, by narrowing down the on-off valve $V_5$ in accordance with an instruction from the controller 110c.

In the finish reclaiming operation, when the concentration of the absorption component in the liquid in the reclaimer 106a reaches a predetermined concentration (for example, several wt %) or less (Yes at Step S15), the controller 110c closes the on-off valves $V_3$, $V_5$, and $V_6$, and finishes the finish reclaiming operation (Step S16). After the finish reclaiming operation is finished, the controller 110c opens the on-off valve $V_4$ and operates the residue discharge pump 106k. In this manner, the residue 1006 is discharged to the outside of the reclaimer 106a.

Figure 10A:
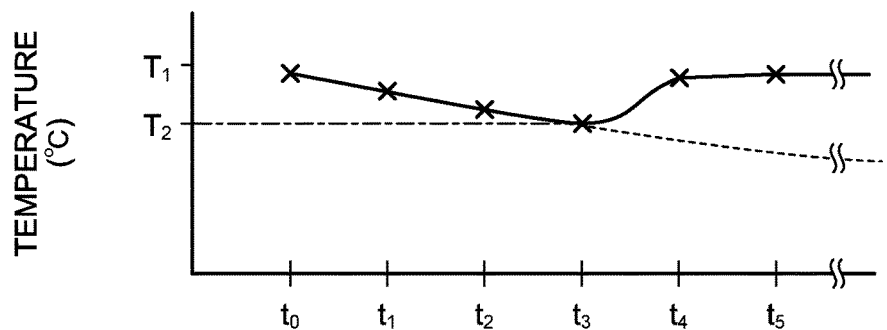
FIG. 10A is a relation diagram between the operating time of a finish reclaiming and temperature.
Figure 10B:
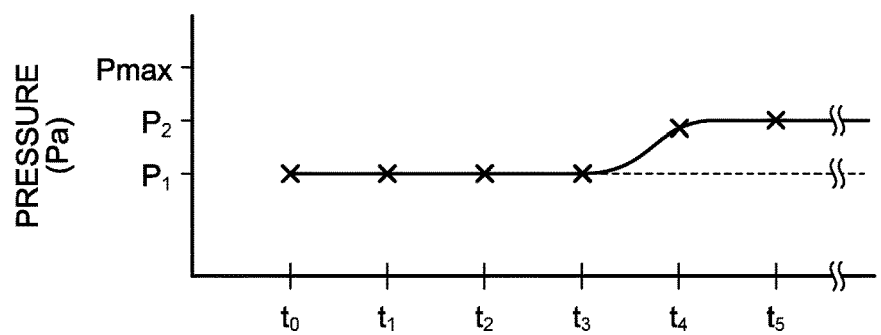
FIG. 10B is a relation diagram between the operating time of the finish reclaiming and pressure.
Figure 10C:
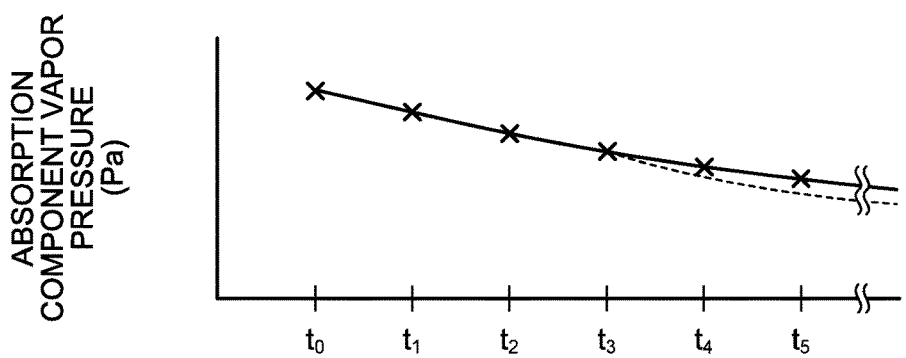
FIG. 10C is a relation diagram between the operating time of the finish reclaiming and absorption component vapor pressure.
Figure 10D:
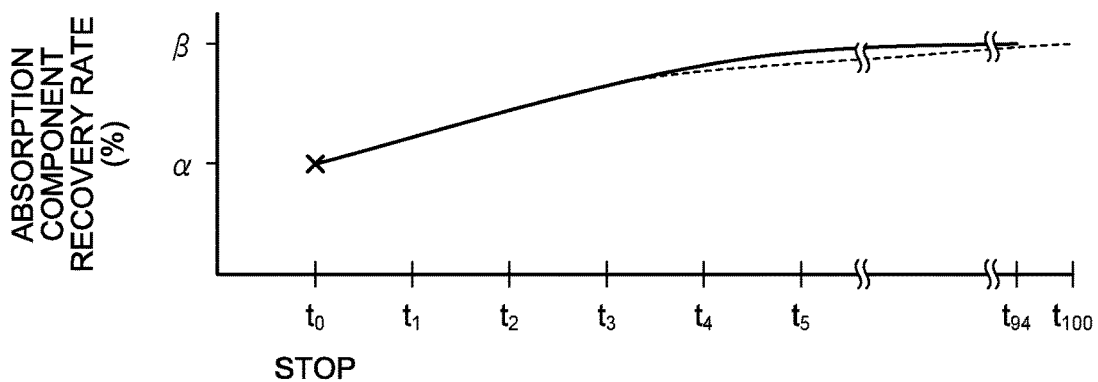
FIG. 10D is a relation diagram between the operating time of the finish reclaiming and the recovery rate of an absorption component.

The following describes a difference between the case of performing operation with the pressure in the reclaimer 106a fixed, which serves as the operation of conventional technology, and the case of performing operation with the reference temperature maintained as in the present invention. In FIG. 10 (FIG. 10A to FIG. 10D), the time t0 in the horizontal axis indicates the time when the lean extraction solution is stopped, and the time t1 to $t_5$ indicates the operation-elapsed time of the finish reclaiming operation. FIG. 10A is a relation diagram between the operating time of the finish reclaiming and temperature, and the vertical axis indicates the temperature (° C.) in the reclaimer. FIG. 10B is a relation diagram between the operating time of the finish reclaiming and pressure, and the vertical axis indicates the pressure (Pa) in the reclaimer. FIG. 10C is a relation diagram between the operating time of the finish reclaiming and absorption component vapor pressure, and the vertical axis indicates the absorption component vapor pressure (Pa) in the reclaimer. FIG. 10D is a relation diagram between the operating time of the finish reclaiming and the recovery rate of the absorption component, and the vertical axis indicates the recovery rate of the absorption component (%).

As illustrated in FIG. 10, when the remaining absorption component is discharged from the residue 1006 in the reclaimer 106a together with the recovered vapor, in the case where the internal pressure in the reclaimer is fixed (broken line in FIG. 10B: pressure $P_1$ is maintained) as in conventional technology, the vapor pressure of the absorption component also decreases with discharge of the absorption component. As a result, in the operation in conventional technology, the temperature of the liquid component in the reclaimer 106a greatly decreases from the temperature $T_1$ at the stopping to a temperature lower than the temperature $T_2$ (broken line in FIG. 10A: temperature decrease).

For this reason, when the temperature decreases (temperature T, at the point in time of the operating time $t_3$), the pressure is regulated (specifically, the on-off valve $V_5$ is narrowed down) to increase the internal pressure, which causes the pressure to increase (solid line in FIG. 10B ($P_1$ to $P_2$)), and thereby decrease of absorption component vapor pressure is hindered (solid line in FIG. 10C: vapor pressure decrease hindrance).

Accordingly, when "finish reclaiming operation" is performed to recover the remaining absorption component after the supply of the lean extraction solution 1003c to the reclaimer 106a is stopped, in the case of regulating (narrowing down the on-off valve $V_5$ to increase the pressure from $P_1$ to $P_2$) the pressure of the reclaimer 106a so as to maintain the temperature of the reclaimer 106a at a predetermined value (first reference temperature $T_1$), the operating time necessary for recovering the absorption component in the residue 1006 in the reclaiming device 106A to the same concentration (for example, 90% recovery) is reduced by approximately 10%, in comparison with the case of adopting the fixed pressure condition ($P_1$: fixed) without performing pressure regulation with the reclaimer temperature serving as the index in conventional technology.

The first reference temperature $T_1$ differs depending on the concentration of the absorption component remaining in the lean extraction solution 1003c continuously introduced into the reclaimer 106a. For example, the first reference temperature $T_1$ falls within the range of 120 to 130° C.

To maintain the predetermined temperature, change of temperature decrease from the first reference temperature $T_1$ to the second reference temperature is preferably set to fall within a range of 10° C. or less. Decrease exceeding 10° C. is not preferable because it less contributes to reduction in the operating time for improving the recovery rate. The temperature of the saturated steam 1004a in this operation is approximately 140 to 150° C.

Specifically, as illustrated in FIG. 10D, supposing that a target recovery rate (target recovery rate β) is achieved at the operating time $t_{100}$ in conventional technology (broken line in FIG. 10D), the target recovery rate (β) is achieved at the operating time $t_{94}$ (solid line in FIG. 10D) when the recovery rate at the initial stage of start of the finish reclaiming operation is α.

For example, when the reclaimer operation to remove non-volatile substances takes several days or more, shortening the finish reclaimer operation enables improvement in efficiency of the entire operation of the reclaiming operation.

In this operation, when the on-off valve $V_5$ is narrowed down to control the pressure such that the first reference temperature $T_1$ is maintained at a target temperature, the pressure of the reclaimer 106a may gradually increase and reach the upper limit value of the prescribed operation pressure of the reclaimer 106a. In this case, before the pressure reaches the pressure upper limit value, the value of the first reference temperature $T_1$ serving as the target is preferably slightly reduced to the second reference temperature $T_2$ (from 120° C. to 115° C.), and the reclaimer control device 110 is preferably controlled such that the second reference temperature $T_2$ is maintained at fixed temperature. This enables stable operation without exceeding the upper limit value of the prescribed operation pressure of the reclaimer 106a.

The target temperature is preferably decreased by a temperature falling within a temperature range of a predetermined temperature (for example, 10° C.) from the first reference temperature $T_1$. This is because low temperature equal to or lower than the predetermined temperature does not contribute to reduction in the operating time of recovery.

The reclaiming method according to the present embodiment includes a step of performing the reclaiming operation to remove non-volatile substances, and a step of performing the finish reclaiming operation to stop introduction of the lean extraction solution into the reclaimer and remove the remaining absorbing liquid while maintaining the reference temperature at the time when the introduction is stopped.

Specifically, the method for operating the reclaiming device 106C according to the third embodiment includes: 1) a step of extracting part of the lean solution 1003a, introducing the part into the reclaimer 106a as the lean extraction solution 1003c, supplying the alkaline agent 106c and the supply water 106f, and performing heating with the heating source, thereby removing the non-volatile component (nitrate and/or sulfate) in the lean extraction solution 1003c as the residue 1006; 2) a step of stopping continuous introduction of the lean extraction solution 1003c into the reclaimer 106a after determining that the desired non-volatile component amount has been removed from the lean extraction solution 1003c; 3) a step of causing the absorption component gasified product to accompany the recovered vapor 1003d while continuously supplying the supply water 106f, to recover the absorption component remaining in the residue 1006; and 4) a step of setting, when the gasified product is caused to accompany, a desired temperature (first reference temperature $T_1$ at the time when the introduction is stopped) in the reclaimer 106a without maintaining the pressure at a fixed value, not in the same manner as conventional technology, and regulating the pressure in the reclaimer 106a to maintain the first reference temperature $T_1$.

In the finish reclaiming operation, control is performed to maintain the reference temperature based on the first reference target temperature. This hinders decrease of the vapor pressure of the absorption component and increases the recovery speed of the absorption component.

In the reclaiming method, the non-volatile substance removal reclaiming operation and the finish reclaiming operation are performed. In the non-volatile substance removal reclaiming operation, non-volatile substances serving as degradation products included in the lean extraction solution 1003c are removed. In the finish reclaiming operation, the introduction of the lean extraction solution 1003c into the reclaimer 106a is stopped, and decrease of the vapor pressure of the absorption component is hindered when the absorption component remaining in the non-volatile component is recovered. This can shorten the time of the finish reclaiming operation and reduce the cost of the reclaiming treatment.

According to the present embodiment, in the finish reclaiming operation of recovering the remaining absorption component after the supply of the lean extraction solution 1003c to the reclaimer 106a is stopped, when the washing liquid 1003f circulating in the water wash section 1003B of the absorption tower 103 for absorbing $CO_2$ is supplied as the supply water 106f at initial stage, the operating time necessary for recovering the absorption component in the residue in the reclaimer 106a to the same concentration can be reduced, in comparison with the supply condition in which only the supply water 106f is supplied without supplying the washing liquid 1003f.

In addition to the control of the supply water 106f, the pressure of the vacuum type reclaiming device 106C is controlled, and the pressure of the reclaimer 106a is regulated such that the temperature of the reclaimer 106a is maintained at the predetermined reference temperature. This can reduce the operating time necessary for recovering the absorption component in the residue 1006 to the same concentration.

Figure 11:
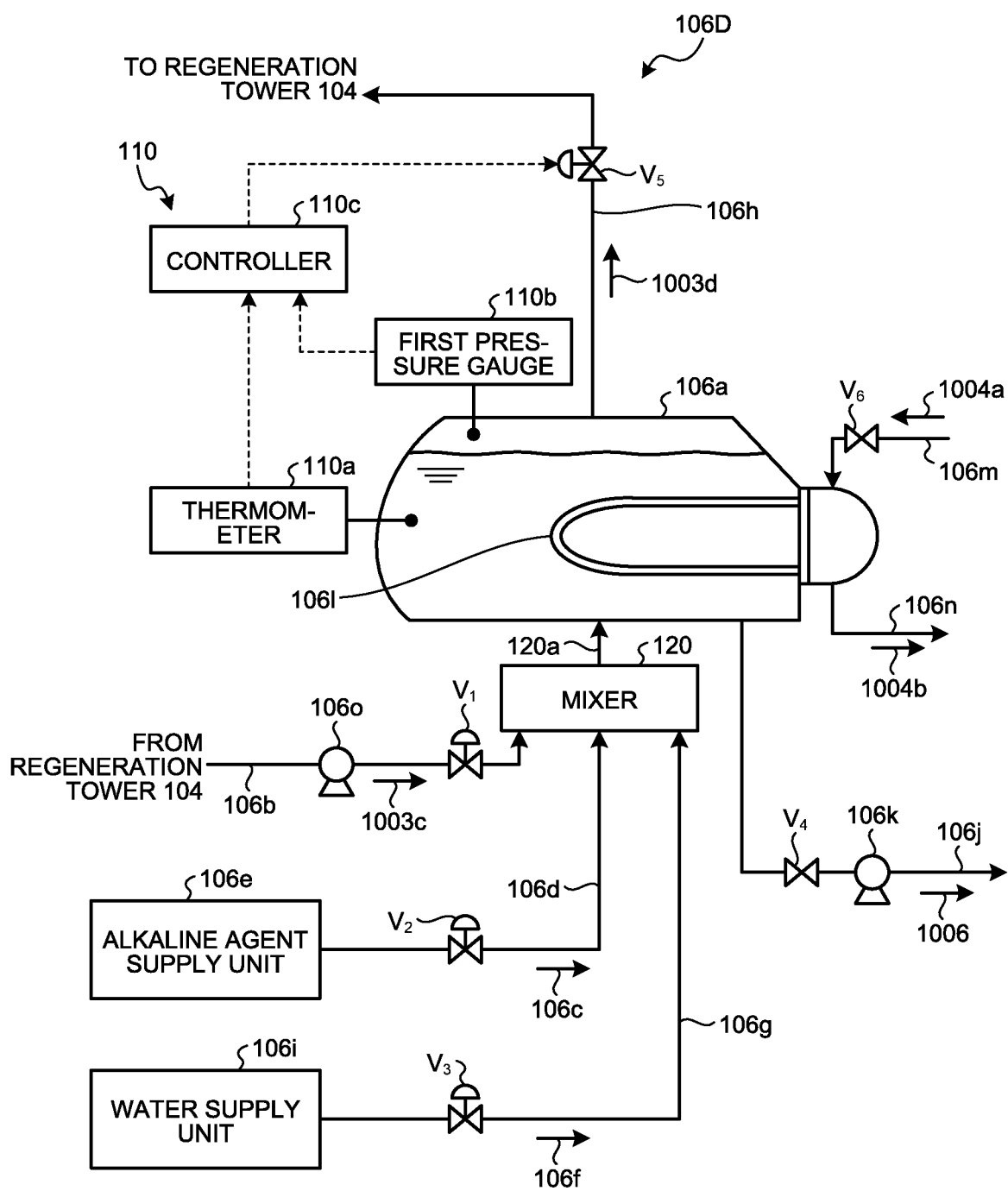
FIG. 11 is a schematic diagram of another reclaiming device according to the third embodiment.

FIG. 11 is a schematic diagram of another reclaiming device according to the third embodiment. In the reclaiming device 106C illustrated in FIG. 7, the lean extraction solution 1003c, the alkaline agent 106c, and the supply water 106f are supplied to the bottom portion of the reclaimer 106a from the extraction pipe 106b, the alkaline agent supply pipe 106d, and the water supply pipe 106g, respectively, but the present invention is not limited thereto. For example, as illustrated in a reclaiming device 106D of FIG. 11, the reclaiming device may have the structure in which a mixer 120 is installed, the mixer 120 is connected with the extraction pipe 106b, the alkaline agent supply pipe 106d, and the water supply pipe 106g, the lean extraction solution 1003c, the alkaline agent 106c, and the supply water 106f are once introduced into the mixer 120 to be brought into a good mixed state, and thereafter the mixture is introduced into the bottom portion of the reclaimer 106a through a mixture supply pipe 120a. To acquire a more homogeneous mixed state, for example, an agitating device or the like may be used. This prevents uneven distribution of mixture when the alkaline agent 106c is separately introduced, and enables promotion of separation of the amine-based absorption component with the alkaline agent 106c.

Fourth Embodiment

Figure 12:
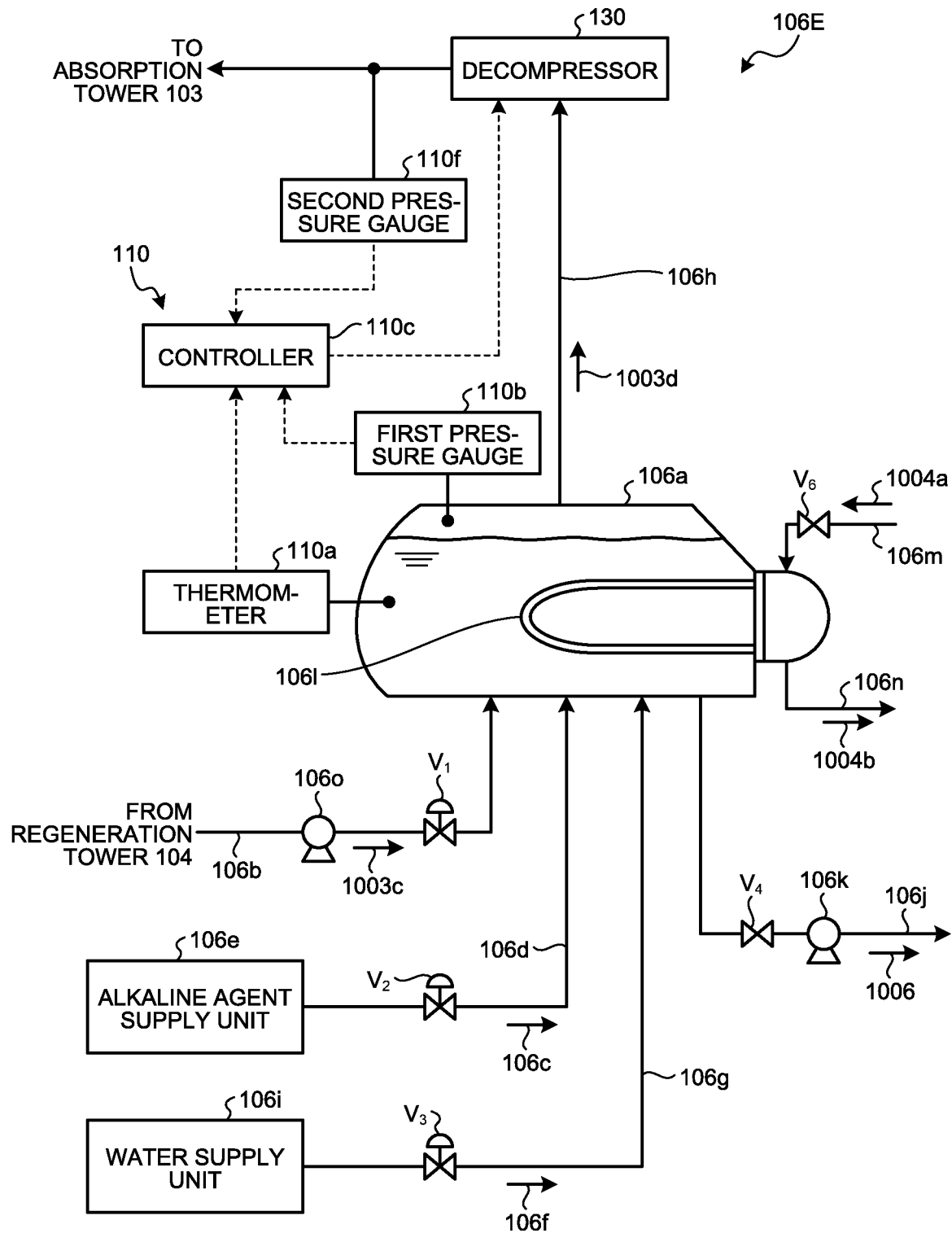
FIG. 12 is a schematic diagram of a reclaiming device according to a fourth embodiment.

FIG. 12 is a schematic diagram of a reclaiming device according to the fourth embodiment. The reclaiming device 106C illustrated in FIG. 7 is a pressurizing type reclaiming device, but the present invention is not limited thereto. The reclaiming device may be a vacuum type reclaiming device.

As illustrated in FIG. 12, a vacuum type reclaiming device 106E is different from the pressurizing type reclaiming device 106C according to the third embodiment, in that the recovered vapor discharge pipe 106h is provided with a decompressor 130. On the discharge side of the decompressor 130, the pressure of the recovered vapor 1003d discharged from the decompressor 130 is measured by a second pressure gauge 110f.

In the vacuum type reclaimer 106a according to the present embodiment, the recovered vapor 1003d discharged from the decompressor 130 may be introduced into either the absorption tower 103 or the regeneration tower 104 by regulating the degree of compression. Specifically, when the compressibility of the decompressor 130 at the time when the recovered vapor 1003d is recovered is 0.5 atm, for example, the recovered vapor 1003d is compressed to 1 atm in order to introduce the recovered vapor 1003d into the absorption tower 103. In order to introduce the recovered vapor 1003d into the regeneration tower 104, for example, the recovered vapor 1003d is compressed to 1.5 to 2.0 atm.

Figure 13:
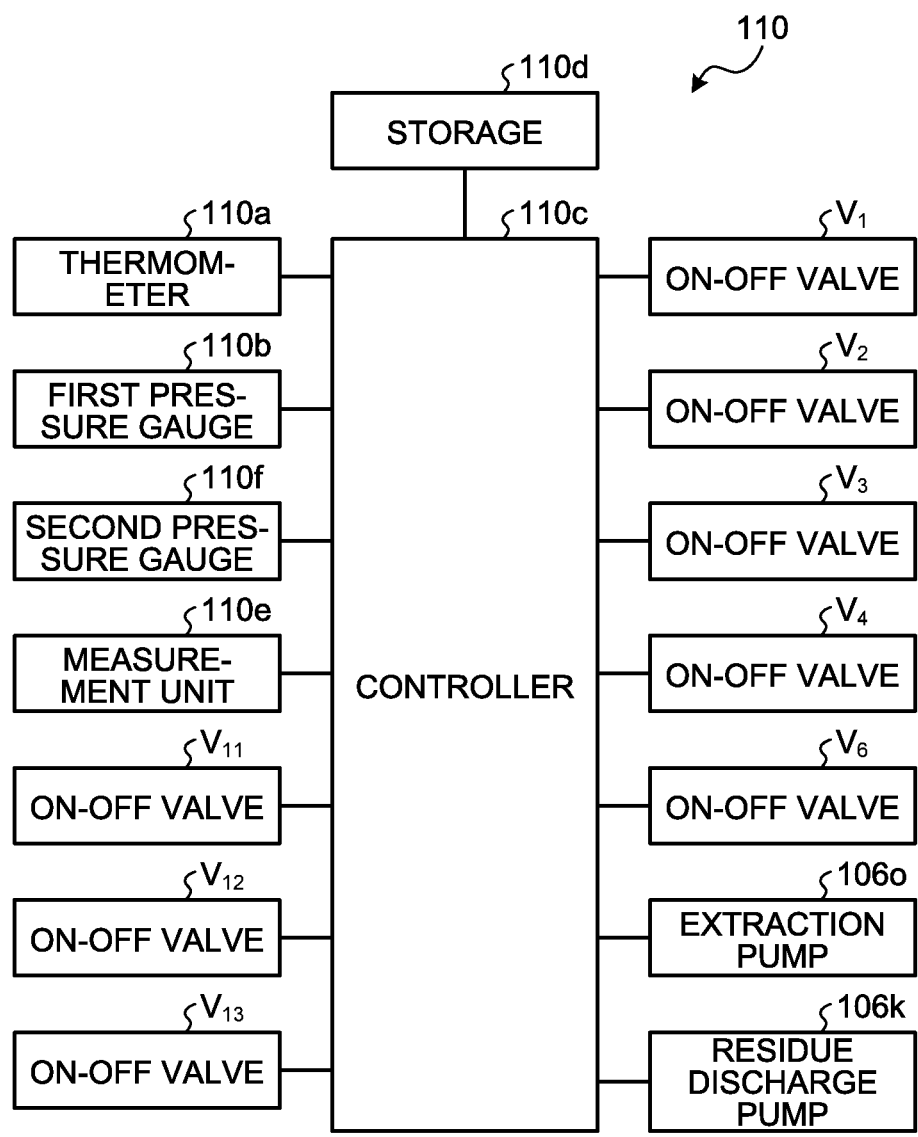
FIG. 13 is a block diagram of a control system of the reclaiming device according to the fourth embodiment.

As illustrated in FIG. 13, the controller 110c is connected with a thermometer 110a, a first pressure gauge 110b, a second pressure gauge 110f, a measurement unit 110e, on-off valves $V_1$ to $V_4$ and $V_6$, and pumps 106o and 106k. The controller 110c integrally controls the on-off valves $V_1$ to $V_4$ and $V_6$ and the pumps 106o and 106k, in accordance with computer programs and/or data stored in advance in storage 110d.

Figure 14:
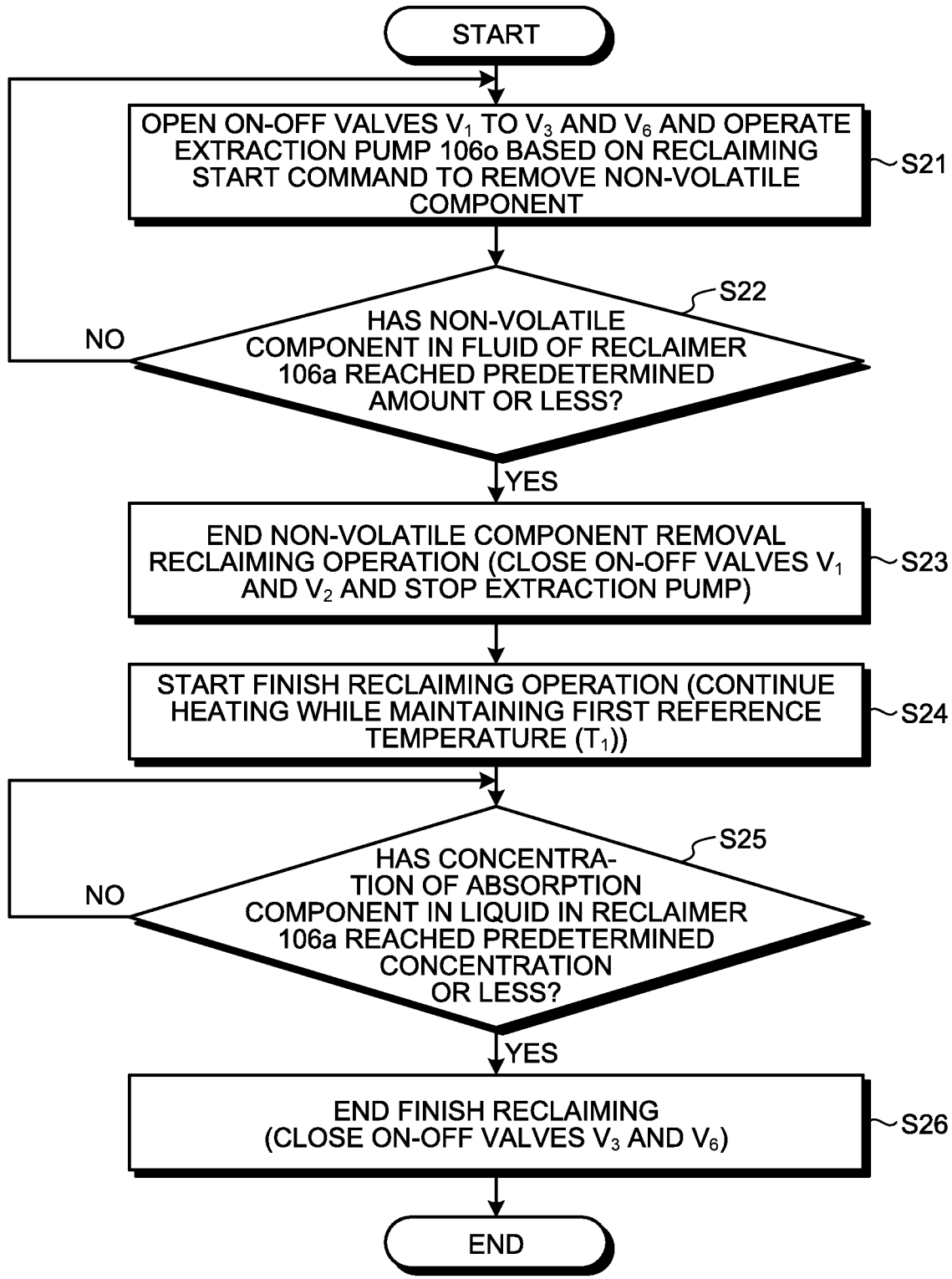
FIG. 14 is a flowchart of control of the reclaiming device according to the fourth embodiment.

As illustrated in FIG. 14, the controller 110c of the reclaiming device 106E according to the present embodiment opens the on-off valves $V_1$ to $V_3$ and $V_6$ and operates the extraction pump 106o, based on a reclaiming start command to remove the non-volatile component (Step S21). In this manner, part of the absorbing liquid 1003 is introduced into the reclaimer 106a as the lean extraction solution 1003c from part of the lean solution 1003a and stored therein, heated together with the alkaline agent 106c and the supply water 106f and vaporized, and returned as the recovered vapor 1003d to the absorption tower 103 or the regeneration tower 104 through the recovered vapor discharge pipe 106h.

Thereafter, based on non-volatile component removal information that is input from the measurement unit 110e, when the controller 110c determines that the non-volatile component in the liquid of the reclaimer 106a has become the predetermined amount or less and removed (Yes at Step S22), the controller 110c closes the on-off valves $V_1$ and $V_2$ and stops the extraction pump 106o, to finish the reclaiming operation of removing the non-volatile component (Step S23). The concentration of the absorption component in the reclaimer 106a when the reclaiming operation of removing the non-volatile component is finished is preferably a concentration (for example, 30 to 60 wt %) substantially equal to or slightly lower than that of the lean solution 1003a circulating in the system, from the viewpoint of recovery of the absorption component, although it differs depending on the type of the absorption component and the operation conditions of the absorption device.

Thereafter, based on a finish reclaiming start command to recover the absorption component, the controller 110c keeps the on-off valves $V_3$ and $V_6$ opened, and continues heating while maintaining the first reference temperature $T_1$ at the time when extraction of the lean extraction solution 1003c is stopped (Step S24).

In the controller 110c, the pressure in the reclaimer 106a is regulated based on the first reference temperature $T_1$ in the reclaimer 106a.

When the amount of the absorption component remaining in the residue 1006 decreases, the vapor pressure of the absorption component decreases, but the decrease in vapor pressure of the absorption component can be hindered by regulating the degree of compression (for example, 0.6 atm when the operation is performed at 0.5 atm) to increase the pressure such that the first reference temperature $T_1$ is maintained. The pressure is increased by changing the degree of compression of the decompressor 130, in accordance with an instruction from the controller 110c.

In the finish reclaiming operation, when the concentration of the absorption component in the liquid in the reclaimer 106a reaches a predetermined concentration (for example, several wt %) or less (Yes at Step S25), the controller 110c closes the on-off valve $V_3$ and $V_6$, and finishes the finish reclaiming operation (Step S26). After the finish reclaiming operation is finished, the controller 110c opens the on-off valve $V_4$ and operates the residue discharge pump 106k. In this manner, the residue 1006 is discharged to the outside of the reclaimer 106a.

As described above, when "finish reclaiming operation" is performed to recover the remaining absorption component after the supply of the lean extraction solution 1003c to the reclaimer 106a is stopped, in the case of regulating (narrowing down the on-off valve $V_5$ to increase the pressure from $P_1$ to $P_2$) the pressure of the reclaimer 106a so as to maintain the temperature of the reclaimer 106a at a predetermined value (first reference temperature $T_1$), the operating time necessary for recovering the absorption component in the residue 1006 in the reclaiming device 106C to the same concentration (for example, 90% recovery) is reduced by approximately 50%, in comparison with the case of adopting the fixed pressure condition ($P_1$: fixed) without performing pressure regulation with the reclaimer temperature serving as the index in conventional technology.

The reason why the reduction rate is improved in comparison with the third embodiment is that, in the case of recovering the absorption component having a high boiling point, the content rate of the absorption component at the time when extraction of the lean extraction solution 1003c is stopped is high, the content rate of the remaining absorption component and the vapor pressure greatly decrease with lapse of the operating time, and the recovery efficiency is improved by regulating the pressure of the reclaimer 106a by the decompressor 130.

In addition, in the present embodiment, after the extraction of the lean extraction solution 1003c is stopped, in the case of regulating the pressure of the reclaimer 106a such that the amount of a decrease of the temperature of the reclaimer 106a at the time when water or the washing liquid of the water wash section and vapor are supplied falls within 10° C. in comparison with the first reference temperature $T_1$, the reduction rate of the operating time necessary for recovering the absorption component in the liquid in the reclaiming device 106C to the same concentration is improved approximately three times or more, in comparison with the case of regulating the pressure such that the difference thereof in temperature is 12° C.

Figure 15:
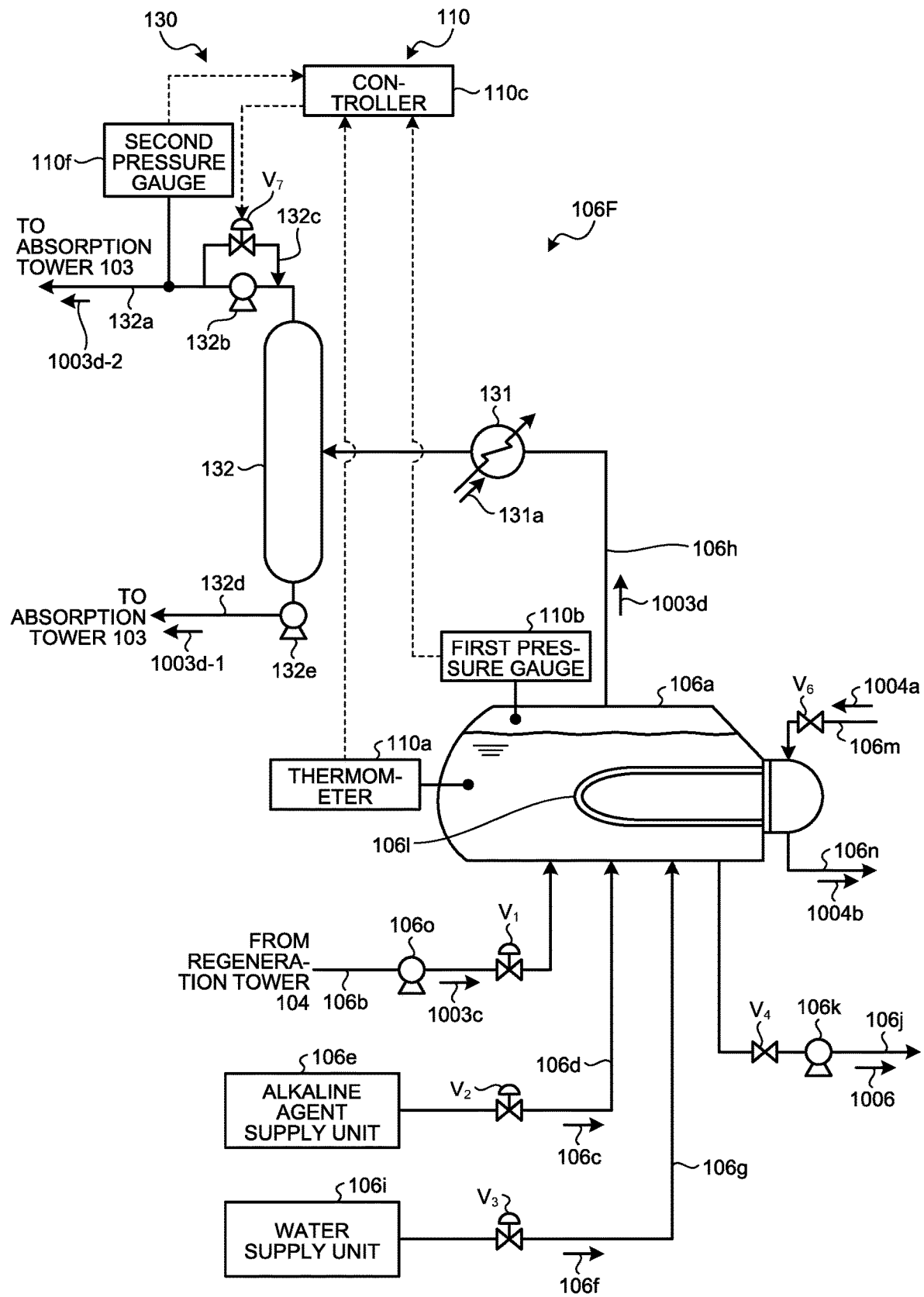
FIG. 15 is a schematic diagram of another reclaiming device according to the fourth embodiment.

FIG. 15 is a schematic diagram of another reclaiming device according to the fourth embodiment. The reclaiming device 106E illustrated in FIG. 12 decompresses the entire amount of the recovered vapor 1003d by the decompressor 130, but the present invention is not limited thereto. A reclaiming device 106F according to the present embodiment has a structure in which a recovered vapor discharge pipe 106h discharging recovered vapor 1003d from a reclaimer 106a when the recovered vapor 1003d is decompressed by the decompressor 130 is provided with a heat exchanger 131 and a gas-liquid separator 132. After the temperature of the recovered vapor 1003d accompanied by the absorption component discharged from the reclaimer 106a is reduced to, for example, 50 to 100° C. by cooling water 131a of the heat exchanger 131, the recovered vapor 1003d is introduced into the gas-liquid separator 132 and flashed. Thereafter, the introduced recovered vapor 1003d is separated into condensate liquid 1003d-1 and recovered vapor condensate liquid separated gas 1003d-2 in the gas-liquid separator 132. A discharge line 132a for the recovered vapor condensate liquid separated gas 1003d-2 is provided with a compressor 132b and an on-off valve $V_7$ disposed on a fine adjustment line 132c performing fine adjustment of the degree of compression of the compressor 132b. The condensate liquid 1003d-1 is discharged by a pump 132e provided in a condensate line 132d.

In the present embodiment, the recovered vapor condensate liquid separated gas 1003d-2 separated from the condensate liquid 1003d-1 is decompressed by the decompressor 130. This eliminates the necessity for decompressing a large amount of recovered vapor 1003d and enables marked reduction in motive power of the decompressor 130, such as a compressor, taken for decompression. Both the condensate liquid 1003d-1 and the recovered vapor condensate liquid separated gas 1003d-2 from the recovered vapor 1003d caused to have normal pressure are introduced into the absorption tower 103.

The present embodiment can reduce the operating time necessary for recovering the absorption component in the residue 1006 in the reclaimer 106a, in the case in which the washing liquid 1003f circulating in the water wash section 1003B of the absorption tower 103 that recovers $CO_2$ is supplied as the supply water 106f at the initial stage, in the finish reclaiming operation of recovering the remaining absorption component after the supply of the lean extraction solution to the reclaimer is stopped, in comparison with the supply condition in which only the supply water 106f is supplied without supplying the washing liquid 1003f.

In addition to the control of the supply water, the pressure of the vacuum type reclaiming device 106F is controlled, and the pressure of the reclaimer 106a is regulated such that the temperature of the reclaimer 106a is maintained at the predetermined reference temperature. This can reduce the operating time necessary for recovering the absorption component in the residue 1006 to the same concentration.

The invention claimed is:

1. An acid gas removal method comprising:
   an acid gas removal step of removing acid gas using an acid gas absorption tower that removes acid gas in a gas by bringing the acid gas into contact with an acid gas absorbing liquid, and an absorbing liquid regeneration tower that regenerates a rich solution having the acid gas absorbed therein as a lean solution using vapor of a reboiler;
   a non-volatile component removal reclaiming step of extracting part of the lean solution regenerated by the regeneration tower, continuously introducing and storing the extracted lean extraction solution into the reclaimer, introducing an alkaline agent and supply water into the reclaimer to heat the lean extraction solution therewith, and recovering a remaining absorption component from the lean extraction solution as recovered vapor while separating a non-volatile component in the lean extraction solution;
   a step of stopping the introduction of the lean extraction solution into the reclaimer; and
      a finish reclaiming step of further recovering the absorption component from a residue in the reclaimer,
   wherein, in the non-volatile component removal reclaiming, first supply water control is performed in which at least one of reflux water from the regeneration tower, steam condensate, and desalinated water is supplied to the reclaimer as first supply water to be supplied to a water supply pipe;
   wherein, at an initial stage of the finish reclaiming, second supply water control is performed in which at least one of the reflux water, the steam condensate, and the desalinated water is supplied to the reclaimer as the first supply water, and a washing liquid including the acid gas absorbing liquid in a water wash section of the acid gas absorption tower is supplied to the reclaimer as second supply water; and wherein, at a later stage of the finish reclaiming, third supply water control is performed in which the supply of the second supply water is stopped and at least one of the reflux water, the steam condensate, and the desalinated water is supplied as the first supply water.

2. The acid gas removal method according to claim 1, wherein switching of implementation of the second supply water control and the third supply water control is performed when a remaining concentration of an acid gas absorption component in the reclaiming residue becomes equal to a concentration of an acid gas absorption component in the washing liquid, or close to the concentration of the acid gas absorption component in the washing liquid.

3. The acid gas removal method according to claim 1, wherein, at the finish reclaiming step, pressure control of regulating pressure in the reclaimer is performed such that a reference temperature is maintained, the reference temperature being a temperature in the reclaimer at the time when the introduction of the lean extraction solution into the reclaimer is stopped.

4. An acid gas removal apparatus comprising:
an acid gas absorption tower that removes acid gas in a gas by bringing the acid gas into contact with an acid gas absorbing liquid;
an absorbing liquid regeneration tower that regenerates, using vapor of a reboiler, a rich solution having the acid gas absorbed therein as a lean solution;
a reclaimer that extracts the lean solution, and introduces and stores therein the extracted lean extraction solution;
an alkaline agent supply pipe that supplies an alkaline agent to an inside of the reclaimer;
a water supply pipe that supplies supply water to the inside of the reclaimer;
a recovered vapor discharge pipe that introduces recovered vapor discharged from the reclaimer into the acid gas absorption tower or the regeneration tower; and
a reclaimer control device that controls operation of the reclaimer,
wherein the reclaimer control device performs:
first supply water control in which at least one of reflux water from the regeneration tower, steam condensate, and desalinated water is supplied to the reclaimer as first supply water to be supplied to the water supply pipe, at non-volatile component removal reclaiming of introducing the lean extraction solution to the reclaimer and separating a non-volatile component in the lean extraction solution;
second supply water control in which at least one of the reflux water, the steam condensate, and the desalinated water is supplied to the reclaimer as the first supply water, and a washing liquid including the acid gas absorbing liquid in a water wash section of the acid gas absorption tower is supplied to the reclaimer as second supply water, at an initial stage of finish reclaiming to recover an absorption component in reclaiming residue after introduction of the lean extraction solution into the reclaimer is stopped; and
third supply water control in which supply of the second supply water is stopped and at least one of the reflux water, the steam condensate, and the desalinated water is supplied as the first supply water, at a later stage of the finish reclaiming.

5. The acid gas removal apparatus according to claim 4, wherein switching of implementation of the second supply water control and the third supply water control is performed when a remaining concentration of an acid gas absorption component in the reclaiming residue becomes equal to a concentration of an acid gas absorption component in the washing liquid, or close to the concentration of the acid gas absorption component in the washing liquid.

6. The acid gas removal apparatus according to claim 4, further comprising:
a thermometer that measures temperature in the reclaimer; and
a pressure gauge that measures pressure in the reclaimer,
wherein the reclaimer control device performs the first supply water control to the third supply water control, and
wherein, at the finish reclaiming of recovering the absorption component in the reclaiming residue after introducing the lean extraction solution into the reclaimer is stopped, the reclaimer control device performs pressure control of regulating the pressure in the reclaimer such that a reference temperature is maintained, the reference temperature being a temperature in the reclaimer at the time when the introduction of the lean extraction solution into the reclaimer is stopped.

7. The acid gas removal apparatus according to claim 6, wherein, when the reclaimer is a pressurizing type reclaimer, regulation of the pressure with the reclaimer control device is performed by regulating a throttle valve installed in the recovered vapor discharge pipe.

8. The acid gas removal apparatus according to claim 6, wherein, when the reclaimer is a vacuum type reclaimer, regulation of the pressure with the reclaimer control device is performed by regulating a decompressor installed in the recovered vapor discharge pipe.

9. The acid gas removal apparatus according to claim 6, wherein, when the pressure in the reclaimer reaches an upper limit pressure value of an operation upper limit of the reclaimer, the reclaimer control device changes a target reference temperature to a temperature lower than the reference temperature and regulates the pressure in the reclaimer such that the changed reference temperature is maintained.

10. The acid gas removal apparatus according to claim 9, wherein the target reference temperature is changed within a temperature range from the reference temperature in the reclaimer at the time when the introduction of the lean extraction solution into the reclaimer is stopped to a temperature lowered by a predetermined temperature from the reference temperature.

* * * * *